US010013158B1

(12) United States Patent
Morris

(10) Patent No.: US 10,013,158 B1
(45) Date of Patent: Jul. 3, 2018

(54) METHODS, SYSTEMS, AND COMPUTER PROGRAM PRODUCTS FOR SHARING A DATA OBJECT IN A DATA STORE VIA A COMMUNICATION

(71) Applicant: Sitting Man, LLC, Raleigh, NC (US)

(72) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 0 days.

(21) Appl. No.: 15/724,235

(22) Filed: Oct. 3, 2017

Related U.S. Application Data

(63) Continuation-in-part of application No. 14/274,623, filed on May 9, 2014, which is a continuation-in-part of application No. 13/626,635, filed on Sep. 25, 2012, now abandoned, and a continuation-in-part of application No. 13/624,906, filed on Sep. 22, 2012, now abandoned.

(51) Int. Cl.
*G06F 15/16* (2006.01)
*G06F 3/0486* (2013.01)
*H04L 12/58* (2006.01)
*G06F 3/0482* (2013.01)

(52) U.S. Cl.
CPC .......... *G06F 3/0486* (2013.01); *G06F 3/0482* (2013.01); *H04L 51/22* (2013.01)

(58) Field of Classification Search
CPC .................................................... G06F 3/0486
USPC ................................. 709/206, 217, 203, 200
See application file for complete search history.

(56) References Cited

U.S. PATENT DOCUMENTS

| | | |
|---|---|---|
| 6,192,394 B1 | 2/2001 | Gutfreund et al. |
| 6,502,236 B1 | 12/2002 | Allen et al. |
| 6,996,599 B1 | 2/2006 | Anders et al. |
| 7,051,119 B2 | 5/2006 | Shafron et al. |
| 7,080,120 B2 | 7/2006 | Betros et al. |
| 7,130,883 B2 | 10/2006 | Zhu et al. |
| 7,133,897 B1 | 11/2006 | Tran |
| 7,209,953 B2 | 4/2007 | Brooks |
| 7,328,239 B1 | 2/2008 | Berberian et al. |
| 7,421,069 B2 | 9/2008 | Vernon et al. |
| 7,426,578 B2 | 9/2008 | Jones et al. |
| 7,529,798 B2 | 5/2009 | Rust |
| 7,533,146 B1 | 5/2009 | Kumar |
| 7,567,553 B2 | 7/2009 | Morris |

(Continued)

FOREIGN PATENT DOCUMENTS

WO    2002077773 A3    6/2009

OTHER PUBLICATIONS

Berners-Lee, T, et al, "Uniform Resource Identifier (URI): Generic Syntax", RFC 3986, pp. 1-61, Jan. 2005, Internet Engineering Task Force (IEFT), http://www.ietf.org/rfc/rfc3986.txt.

(Continued)

*Primary Examiner* — El Hadji Sall
(74) *Attorney, Agent, or Firm* — Patrick E. Caldwell, Esq.; The Caldwell Firm, LLC

(57) ABSTRACT

Methods, apparatuses, and systems are described for sharing a folder and any contents (e.g. file(s)) thereof, via at least one communication. In an aspect, the folder and any contents (e.g. file(s)) thereof may be shared through a specific combination of capabilities or operations involving an email message and a file explorer interface without an attachment included with the at least one email message.

30 Claims, 15 Drawing Sheets

(56) References Cited

U.S. PATENT DOCUMENTS

| | | |
|---|---|---|
| 7,613,772 B2 | 11/2009 | Bartram et al. |
| 7,623,650 B2 | 11/2009 | Dalton et al. |
| 7,624,148 B2 | 11/2009 | Dalen |
| 7,653,668 B1 | 1/2010 | Shelat et al. |
| 7,680,950 B1 | 3/2010 | Slaughter et al. |
| 7,701,882 B2 | 4/2010 | Jones et al. |
| 7,757,265 B2 | 7/2010 | Reynolds et al. |
| 7,765,581 B1 | 7/2010 | Caronni et al. |
| 7,783,718 B2 | 8/2010 | Modi |
| 7,809,709 B1 | 10/2010 | Harrison |
| 7,809,854 B2 | 10/2010 | Jung et al. |
| 7,904,369 B1 | 3/2011 | Andreasen et al. |
| 7,949,722 B1 | 5/2011 | Ullman et al. |
| 7,953,853 B2 | 5/2011 | Christensen et al. |
| 8,020,190 B2 | 9/2011 | Plummer |
| 8,060,619 B1 | 11/2011 | Saulpaugh et al. |
| 8,214,329 B2 | 7/2012 | Gilder et al. |
| 8,280,948 B1 | 10/2012 | Chen |
| 8,321,499 B2 | 11/2012 | Reisman |
| 8,332,654 B2 | 12/2012 | Anbuselvan |
| 8,359,361 B2 | 1/2013 | Thornton et al. |
| 8,583,745 B2 | 11/2013 | Bearman et al. |
| 8,671,145 B2 | 3/2014 | Roskowski et al. |
| 8,683,576 B1 | 3/2014 | Yun |
| 8,719,251 B1 | 5/2014 | English et al. |
| 8,775,511 B2 | 7/2014 | Vernon et al. |
| 8,812,733 B1 | 8/2014 | Black et al. |
| 8,824,643 B2 | 9/2014 | Sahai |
| 8,849,914 B2 | 9/2014 | Bove et al. |
| 8,909,710 B2 | 12/2014 | Blackstock et al. |
| 8,996,658 B2 | 3/2015 | Anbuselvan |
| 9,053,203 B2 | 6/2015 | Wilson et al. |
| 9,299,056 B2 | 3/2016 | Kallman et al. |
| 2002/0087505 A1 | 7/2002 | Smith et al. |
| 2002/0087522 A1 | 7/2002 | MacGregor et al. |
| 2002/0143855 A1 | 10/2002 | Traversat et al. |
| 2002/0147840 A1 | 10/2002 | Mutton et al. |
| 2003/0172127 A1 | 9/2003 | Northrup et al. |
| 2003/0200268 A1 | 10/2003 | Morris |
| 2004/0015610 A1 | 1/2004 | Treadwell |
| 2004/0024754 A1 | 2/2004 | Mane et al. |
| 2004/0044727 A1 | 3/2004 | Abdelaziz et al. |
| 2004/0064478 A1 | 4/2004 | Canesi |
| 2004/0064511 A1 | 4/2004 | Abdel-Aziz et al. |
| 2004/0088347 A1 | 5/2004 | Yeager et al. |
| 2004/0117456 A1 | 6/2004 | Brooks |
| 2004/0186894 A1* | 9/2004 | Jhingan ............ G06Q 10/107 709/207 |
| 2005/0010646 A1 | 1/2005 | Shiina |
| 2005/0102348 A1 | 5/2005 | Parsons et al. |
| 2005/0114664 A1 | 5/2005 | Davin |
| 2005/0114671 A1 | 5/2005 | Little et al. |
| 2005/0223073 A1 | 10/2005 | Malik |
| 2006/0069787 A1 | 3/2006 | Sinclair et al. |
| 2006/0095531 A1 | 5/2006 | Cho |
| 2006/0224583 A1 | 10/2006 | Fikes et al. |
| 2006/0224608 A1 | 10/2006 | Zamir et al. |
| 2006/0224615 A1 | 10/2006 | Korn et al. |
| 2006/0224624 A1 | 10/2006 | Korn et al. |
| 2006/0224938 A1 | 10/2006 | Fikes et al. |
| 2006/0256934 A1 | 11/2006 | Mazor |
| 2007/0067726 A1 | 3/2007 | Flynt et al. |
| 2007/0078902 A1 | 4/2007 | Buschi et al. |
| 2007/0100713 A1 | 5/2007 | Favero et al. |
| 2007/0136430 A1* | 6/2007 | Qureshi ............ H04L 51/30 709/206 |
| 2007/0180150 A1 | 8/2007 | Eisner et al. |
| 2008/0005103 A1 | 1/2008 | Ratcliffe et al. |
| 2008/0016160 A1 | 1/2008 | Walter et al. |
| 2008/0056459 A1* | 3/2008 | Vallier ............ H04L 29/06027 379/88.12 |
| 2008/0059500 A1 | 3/2008 | Symens |
| 2008/0098075 A1 | 4/2008 | O'Bryan |
| 2008/0155110 A1 | 6/2008 | Morris |
| 2008/0172483 A1* | 7/2008 | Mickeleit ............ H04L 51/38 709/223 |
| 2008/0201364 A1 | 8/2008 | Buschi et al. |
| 2008/0256199 A1* | 10/2008 | Pesala ............ G06Q 10/107 709/206 |
| 2008/0320094 A1 | 12/2008 | Tu et al. |
| 2009/0157829 A1 | 6/2009 | Choi et al. |
| 2009/0157859 A1 | 6/2009 | Morris |
| 2009/0177526 A1 | 7/2009 | Aaltonen et al. |
| 2009/0222450 A1 | 9/2009 | Zigelman |
| 2009/0254601 A1 | 10/2009 | Moeller et al. |
| 2009/0265426 A1 | 10/2009 | Svendsen et al. |
| 2009/0327904 A1 | 12/2009 | Guzak et al. |
| 2010/0011077 A1 | 1/2010 | Shkolnikov et al. |
| 2010/0070602 A1 | 3/2010 | Malik |
| 2010/0169442 A1 | 7/2010 | Liu et al. |
| 2010/0235439 A1 | 9/2010 | Goodnow |
| 2010/0312782 A1 | 12/2010 | Li et al. |
| 2011/0072033 A1 | 3/2011 | White et al. |
| 2011/0138004 A1 | 6/2011 | McConn et al. |
| 2011/0276637 A1 | 11/2011 | Thornton et al. |
| 2012/0011207 A1 | 1/2012 | Morris |
| 2012/0011444 A1 | 1/2012 | Morris |
| 2013/0046992 A1 | 2/2013 | Resch et al. |
| 2013/0318176 A1* | 11/2013 | Claux ............ G06Q 10/107 709/206 |
| 2014/0089419 A1 | 3/2014 | Morris |
| 2014/0089420 A1 | 3/2014 | Morris |
| 2014/0089421 A1 | 3/2014 | Morris |
| 2014/0108487 A1 | 4/2014 | Rosset et al. |
| 2014/0112319 A1 | 4/2014 | Morris |
| 2014/0172999 A1 | 6/2014 | Morris |
| 2014/0279050 A1 | 9/2014 | Maker et al. |

OTHER PUBLICATIONS

Crocker, D, "Standard for the Format of ARPA Internet Text Messages", RFC 822, pp. 1-47, Aug. 1982, Internet Engineering Task Force (IEFT), http://www.ieft.org/rfc/rfc822.txt.

Fielding, R, et al, "Hypertext Transfer Protocol—HTIP/1.1", RFC 2616, pp. 1-114, Jun. 1999, Internet Engineering Task Force (IEFT), http://www.ietf.org/rfc/rfc2616.txt.

Freed, N, et al, "Multipurpose Internet Mail Extensions (MIME) Part 1: Format of Internet Message Bodies", RFC 2045, pp. 1-31, Nov. 1996, Internet Engineering Task Force (IEFT), http://www.ietf.org/rfc/rfc2045.txt.

Hoffman, P, et al, "The mailto URL scheme", RFC 2368, pp. 1-10, Jul. 1998, Internet Engineering Task Force (IEFT), http://www.ietf.org/rfc/rfc2368. txt.

Klensin, J, "Simple Mail Transfer Protocol", RFC 5321, pp. 1-95, Oct. 2008, Internet Engineering Task Force (IEFT), http://www.ietf.org/rfc/rfc5321.txt.

Myers, J, et al, "Post Office Protocol—version 3", RFC 1939, pp. 1-23, May 1996, Internet Engineering Task Force (IEFT), http://www.ietf.org/rfc/rfc1939.txt.

Office Action Summary in U.S. Appl. No. 12/833,014 dated Aug. 2, 2012.

Office Action Summary in U.S. Appl. No. 12/833,016 dated Feb. 14, 2014.

Office Action Summary in U.S. Appl. No. 12/833,016 dated May 10, 2013.

Office Action Summary in U.S. Appl. No. 12/833,016 dated Sep. 20, 2012.

Office Action Summary in U.S. Appl. No. 13/624,906 dated Dec. 31, 2014.

Office Action Summary in U.S. Appl. No. 13/624,940 dated Jul. 18, 2014.

Office Action Summary in U.S. Appl. No. 13/626,635 dated Aug. 29, 2014.

Office Action Summary in U.S. Appl. No. 13/647,144 dated Dec. 1, 2014.

Office Action Summary in U.S. Appl. No. 13/654,647 dated Sep. 25, 2014.

(56) References Cited

OTHER PUBLICATIONS

Office Action Summary in U.S. Appl. No. 13/716,156 dated Mar. 26, 2015.
Office Action Summary in U.S. Appl. No. 13/716,158 dated May 8, 2015.
Office Action Summary in U.S. Appl. No. 13/716,159 dated Oct. 7, 2015.
Office Action Summary in U.S. Appl. No. 13/716,160 dated Oct. 26, 2015.
Office Action Summary in U.S. Appl. No. 14/274,623 dated Mar. 29, 2017.
Office Action Summary in U.S. Appl. No. 14/274,623 dated Oct. 3, 2016.
Resnick, E, "Internet Message Format", RFC 5322, pp. 1-57, Oct. 2008, Internet Engineering Task Force (IEFT), http://www.ietf.org/rfc/rfc5322.txt.
Richardson T, et al, "The Remote Framebuffer Protocol", RFC 6143, pp. 1-39, Mar. 2011, Internet Engineering Task Force (IEFT), http://www.ietf.org/rfc/rfc6143.txt.
Rosenberg, J, et al, "SIP: Session Initiation Protocol", RFC 3261, pp. 1-269, Jun. 2002, Internet Engineering Task Force (IEFT), http://www.ietf.org/rfc/rfc3261.txt.
Wilde, E, et al, "URI Scheme for Global System for Mobile Communications (GSM) Short Message Service", RFC 5724, pp. 1-18, Jan. 2010, Internet Engineering Task Force (IEFT), http://www.ietf.org/rfc/rfc5724.txt.

\* cited by examiner

```
                                  800a
MIME-Version: 1.0
Content-Type: multipart/mixed; boundary="--toOo----OoOt--------"

--toOo----OoOt---------
Content-Type: text/plain
Dad,

See attached.                  802a

Love,
William
--toOo----OoOt---------
Content-Type: application/mount-desscirptor       806a
                                               808a
smb://SecondNode/Music                                        810a    804a
http://firstuser@secondnode.tld/users/seconduser/documents/media/music/
ftp://SecondNode/music/
--toOo----OoOt---------       812a
```

Fig. 8A

```
                                  800b
MIME-Version: 1.0
Content-Type: multipart/mixed; boundary="--OoOT----toOo--------"
                          814b
--OoOT----toOo---------
Content-Type: text/plain
Hi, this is the first message    812b
--OoOT----toOo---------                              804b
Content-Type: application/id-request
Accept: image/*            806b
<id-request>
  <and>                    810a
808b  <criterion attribute="query" type="keyword" match-expression=""*music*"" />    802b
      <criterion attribute="scope" ressource-type="folder" />
  </and>
</remote-attach-requestt>
--OoOT----toOo--------
```

FIG. 8B

METHODS, SYSTEMS, AND COMPUTER PROGRAM PRODUCTS FOR SHARING A DATA OBJECT IN A DATA STORE VIA A COMMUNICATION

RELATED APPLICATIONS

The present application is a continuation-in-part and claims priority to U.S. patent application Ser. No. 14/274,623 (published under US 2014-0365588 A1) filed May 9, 2014 and entitled "METHODS, SYSTEMS, AND COMPUTER PROGRAM PRODUCTS FOR PROCESSING A DATA OBJECT IDENTIFICATION REQUEST IN A COMMUNICATION," which is a continuation-in-part and claims priority to U.S. patent application Ser. No. 13/626,635 (published under US 2014-0089421 A1) filed Sep. 25, 2012 and entitled "METHODS, SYSTEMS, AND PROGRAM PRODUCTS FOR SHARING A DATA OBJECT IN A DATA STORE VIA A COMMUNICATION"; and U.S. patent application Ser. No. 13/624,906 (published US 2014-0089419 A1) filed Sep. 22, 2012 and entitled "METHODS, SYSTEMS, AND PROGRAM PRODUCTS FOR PROCESSING A DATA OBJECT IDENTIFICATION REQUEST IN A COMMUNICATION."

This application is related to the following U.S. Patent Applications, which are each incorporated herein by reference for all purposes:

U.S. patent application Ser. No. 13/626,635 (published under US 2014-0089421 A1) filed on 2012 Sep. 25 and entitled "METHODS, SYSTEMS, AND PROGRAM PRODUCTS FOR SHARING A DATA OBJECT IN A DATA STORE VIA A COMMUNICATION";

U.S. patent application Ser. No. 12/833,016 (published under US 2012-0011444 A1) filed on 2010 Jul. 9, entitled "METHODS, SYSTEMS, AND PROGRAM PRODUCTS FOR REFERENCING AN ATTACHMENT IN A COMMUNICATION";

U.S. patent application Ser. No. 12/833,014 (published under US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION";

U.S. patent application Ser. No. 13/624,906 (published under US 2014-0089419 A1) filed on 2012 Sep. 22, entitled "METHODS, SYSTEMS, AND PROGRAM PRODUCTS FOR PROCESSING A DATA OBJECT IDENTIFICATION REQUEST IN A COMMUNICATION";

U.S. patent application Ser. No. 13/624,940 (published under US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT"; the entire contents of each are herein incorporated by reference for all purposes.

BACKGROUND

A variety of means exist for sharing filed, folders, and other data via network. For each a user must know how to configure and/or setup the sharing. For example, sharing a file a Samba file system is different than sharing a via cloud based storage system, such as DROPBOX. Sharing via email is still different. Sharing copies of files is perhaps the best know means and most widely used means for sharing copies. It would useful if sharing files, folders, directory data, and other network accessible data were as easy as sending an attachment in an email.

Accordingly, there exists a need for methods, systems, and computer program products for sharing a data object in a data store via a communication.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, an apparatus is provided, comprising: at least one non-transitory memory storing instructions; and one or more processors in communication with the at least one non-transitory memory, wherein the one or more processors execute the instructions to: cause, at a first node, display of at least one first interface with a first user interface element, utilizing first hypertext markup language-equipped code that is sent via at least one network; receive, from the first node via the at least one network, an indication of at least one folder via the first user interface element, utilizing the at least one first interface; cause, at the first node, display of at least one second interface with a second user interface element, utilizing second hypertext markup language-equipped code that is sent via the at least one network; receive, from the first node via the at least one network, indicia associated with at least one email address via the second user interface element, utilizing the at least one second interface; receive, from the first node via the at least one network, an indication to share the at least one folder; based on the receipt of the indication of the at least one folder, the indicia associated with the at least one email address, and the indication to share the at least one folder via the at least one network; generate at least one email message identifying the at least one folder and including a reference to the at least one folder, without including at least one file in the at least one folder as an attachment of the at least one email message; send, to a second node via the at least one network, the at least one email message, without including the at least one file in the at least one folder as an attachment of the at least one email message; based on the receipt of the indication of the at least one folder, the indicia associated with the at least one email address, and the indication to share the at least one folder via the at least one network; cause, utilizing particular code configured to be stored on a storage at the second node and further configured to cooperate with a file explorer interface, creation of a representation of the at least one folder in a location among one or more folders on the file explorer interface, where the storage at the second node does not store the at least one file in the at least one folder when the creation of the representation is caused; cause, at the second node, display of the representation of the at least one folder in the location among the one or more folders on the file explorer interface; detect, utilizing the file explorer interface at the second node, an indication to open the at least one file in the at least one folder; and in response to detection of the indication to open the at least one file in the at least one folder, cause retrieval of the at least one file via the at least one network for permitting display of the at least one file utilizing the file explorer interface at the second node.

In another embodiment, a system is provided, comprising: at least one non-transitory memory storing instructions; and one or more processors in communication with the at least one non-transitory memory, wherein the one or more processors execute the instructions to: send a first communication over at least one network that results in display, at a first node, a first user interface element, a second user interface element, and a third user interface element; receive, from the first node via the at least one network, information associated with at least one data object via the first user interface element; receive, from the first node via the at least one network, an object associated with at least one email address via the second user interface element; receive, from the first node via the at least one network, an indication of a selection of the third user interface element; based on the receipt of the information associated with the at least one data object, the object associated with the at least one email address, and the indication of the selection of the third user interface element via the at least one network; send, to a second node via the at least one network, at least one email message identifying the at least one data object and including a reference to the at least one data object, without including a file attachment with the at least one email message; based on the receipt of the information associated with the at least one data object, the object associated with the at least one email address, and the indication of the selection of the third user interface element via the at least one network; cause, utilizing code configured to be stored on a storage at the second node and further configured to cooperate with a file explorer interface of a client-based file explorer application, creation of a representation of the at least one data object in a location among one or more folders on the file explorer interface, where the storage at the second node does not store any file in the at least one data object when the creation of the representation of the at least one data object is caused; and cause, at the second node, display of the representation of the at least one data object in the location among the one or more folders on the file explorer interface.

In still yet another embodiment, a computer-implemented method is provided, comprising: displaying, at a first node, at least one first interface with a first user interface element, utilizing first hypertext markup language-equipped code that is received via at least one network; receiving, utilizing the at least one first interface at the first node, an indication of at least one folder via the first user interface element; sending, from the first node via the at least one network, the indication of the at least one folder; displaying, at the first node, at least one second interface with a second user interface element, utilizing second hypertext markup language-equipped code that is received via the at least one network; receiving, utilizing the at least one second interface at the first node, indicia associated with at least one email address via the second user interface element; sending, from the first node via the at least one network, the indicia associated with the at least one email address; receiving, at the first node, an indication to share the at least one folder; sending, from the first node via the at least one network, the indication to share the at least one folder; after the indication of the at least one folder, the indicia associated with the at least one email address, and the indication to share the at least one folder are sent from the first node via the at least one network; receiving, at a second node via the at least one network, at least one email message identifying the at least one folder and including a reference to the at least one folder, without including at least one file in the at least one folder as an attachment of the at least one email message; after the indication of the at least one folder, the indicia associated with the at least one email address, and the indication to share the at least one folder are sent from the first node via the at least one network; creating, utilizing code configured to be stored on a storage at the second node and further configured to cooperate with a file explorer interface, a representation of the at least one folder in a location among one or more folders on the file explorer interface, where the storage of the second node does not store the at least one file in at least one folder when the representation is created; displaying, at the second node, the representation of the at least one folder in the location among the one or more folders on the file explorer interface; receiving, utilizing the file explorer interface at the second node, an indication to open the at least one file in the at least one folder; in response to the receipt of the indication to open the at least one file in the at least one folder, retrieving the at least one file via the at least one network; and in response to the retrieval of the at least one file via the at least one network, displaying the at least one file utilizing the file explorer interface at the second node.

In still yet another embodiment, a system is provided, comprising: a first node in communication with a second node via at least one network; said first node configured to: display, at the first node, a first user interface element, a second user interface element, and a third user interface element; receive, at the first node, information associated with at least one folder via the first user interface element; send, from the first node via the at least one network, the information associated with the at least one folder; receive, at the first node, an object associated with at least one email address via the second user interface element; send, from the first node via the at least one network, the object associated with the at least one email address; receive, at the first node, a message associated with a selection of the third user interface element; and send, from the first node via the at least one network, the message associated with the selection of the third user interface element; said second node configured to: after the information associated with the at least one folder, the object associated with the at least one email address, and the message associated with the selection of the third user interface element via the at least one network; receive, at the second node via the at least one network, at least one email message identifying the at least one folder and including a reference to the at least one folder, without including a file attachment with the at least one email message; after the information associated with the at least one folder, the object associated with the at least one email address, and the message associated with the selection of the third user interface element via the at least one network; create, utilizing code configured to be stored on a storage at the second node and further configured to cooperate with a file explorer interface, a representation of the at least one folder in a location among one or more folders on the file explorer interface, where the storage of the second node does not store any file in the at least one folder when the representation of the at least one folder is created; and display, at the second node, the representation of the at least one folder in the location among the one or more folders on the file explorer interface.

In other embodiments, methods and systems are described for sharing a data object in a data store via a communication. In one aspect, the method includes receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment. The method further includes detecting the mount descriptor. The method still further includes determining a first location in a first data store in the first execution environment. The method additionally includes creating, based on the mount descriptor, a representation of the data object at the location, wherein accessing the representation includes accessing the data object from the second data store. Performing at least one the preceding actions comprising the method includes execution of an instruction by a processor.

Also, a system for sharing a data object in a data store via a communication is described that includes one or more processors and logic encoded in one or more tangible media for execution by the one or more processors that when executed is operable for receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment; detecting the mount descriptor; determining a first location in a first data store in the first execution environment; and creating, based on the mount descriptor, a representation of the data object at the location, wherein accessing the representation includes accessing the data object from the second data store.

Further, a system for sharing a data object in a data store via a communication is described. The system includes a content manager component for receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment. The system further includes a descriptor handler component for detecting the mount descriptor. The system still further includes a data store navigator component for determining a first location in a first data store in the first execution environment. The system additionally includes a mount service component for, creating, based on the mount descriptor, a representation of the data object at the location, wherein accessing the representation includes accessing the data object from the second data store. The system also includes a processor, wherein at least one of the content manager component, the descriptor handler component, the data store navigator component, and the mount service component includes an instruction that is executed by the processor during operation of the system.

Methods and systems are described for sharing a data object in a data store via a communication. In one aspect, the method includes receiving, by a second communications agent that represents a second user, data object information that identifies a data object in a second data store in a second execution environment that includes the second communications agent. The method further includes creating a mount descriptor for accessing the data object from the second data store by a first data store in a first execution environment including a first communications agent that represents a first user. The method still further includes including, by the second communications agent, the mount descriptor in a first message, addressed to the first user. The method additionally includes sending, via a communications protocol via the network by the second communications agent, the first message for delivery to the first communications agent to create, based on the mount descriptor, a representation, of the data object in the first data storage, that when accessed includes accessing the data object from the second data store. Performing at least one the preceding actions comprising the method includes execution of an instruction by a processor.

Also, a system for sharing a data object in a data store via a communication is described that includes one or more processors and logic encoded in one or more tangible media for execution by the one or more processors that when executed is operable for receiving, by a second communications agent that represents a second user, data object information that identifies a data object in a second data store in a second execution environment that includes the second communications agent; creating a mount descriptor for accessing the data object from the second data store by a first data store in a first execution environment including a first communications agent that represents a first user; including, by the second communications agent, the mount descriptor in a first message, addressed to the first user; and sending, via a communications protocol via the network by the second communications agent, the first message for delivery to the first communications agent to create, based on the mount descriptor, a representation, of the data object in the first data storage, that when accessed includes accessing the data object from the second data store.

Further, a system for sharing a data object in a data store via a communication is described. The system includes a descriptor handler component for receiving, by a second communications agent that represents a second user, data object information that identifies a data object in a second data store in a second execution environment that includes the second communications agent. The system further includes a descriptor generator component for creating a mount descriptor for accessing the data object from the second data store by a first data store in a first execution environment including a first communications agent that represents a first user. The system still further includes a content manager component for including, by the second communications agent, the mount descriptor in a first message, addressed to the first user. The system additionally includes a com-out component for, sending, via a communications protocol via the network by the second communications agent, the first message for delivery to the first communications agent to create, based on the mount descriptor, a representation, of the data object in the first data storage, that when accessed includes accessing the data object from the second data store. The system also includes a processor, wherein at least one of the descriptor handler component, the descriptor generator component, the content manager component, and the com-out component includes an instruction that is executed by the processor during operation of the system.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 8A illustrates an exemplary portion of a communication between an execution environment of a first node and an execution environment of a second node according to an aspect of the subject matter described herein; and FIG. 8B illustrates another exemplary portion of a communication between an execution environment of a first node and an execution environment of a second node according to an aspect of the subject matter described herein.

DETAILED DESCRIPTION

Figure 1:
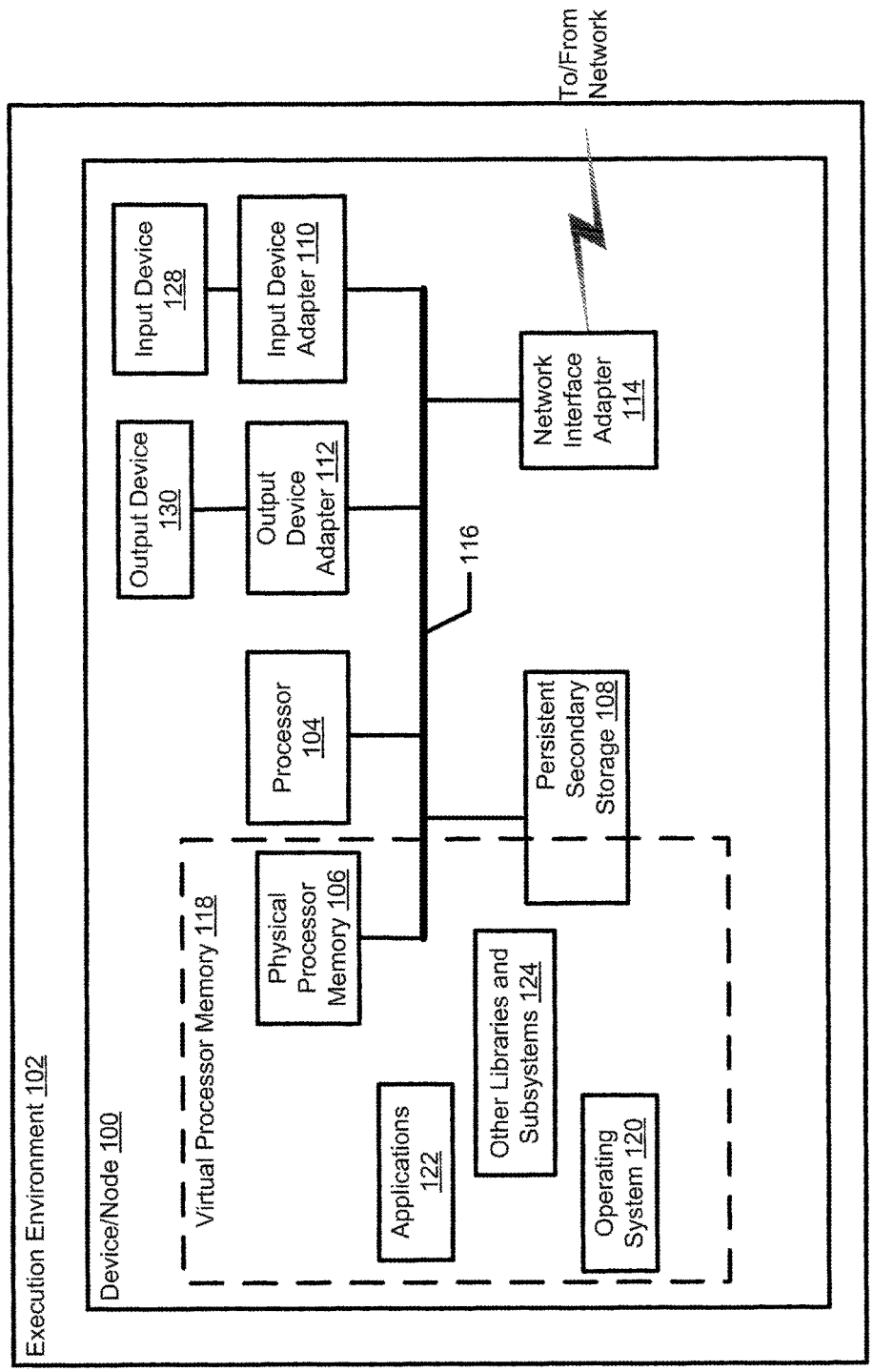
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present specification, including definitions, will control. In addition, the materials, methods, and examples are illustrative only and not intended to be limiting.

An exemplary device included in an execution environment that may be configured according to the subject matter is illustrated in FIG. 1. An "execution environment", as used herein, is an arrangement of hardware and, in some aspects, software that may be further configured to include and/or otherwise host an arrangement of components for performing a method of the subject matter described herein. An execution environment includes and/or is otherwise provided by one or more devices. The execution environment is said to be the execution environment of the device and/or devices. An execution environment may be and/or may include a virtual execution environment including software components operating in a host execution environment. Exemplary devices included in and/or otherwise providing suitable execution environments for configuring according to the subject matter include personal computers, notebook computers, tablet computers, servers, portable electronic devices, handheld electronic devices, mobile devices, multiprocessor devices, distributed systems, consumer electronic devices, routers, communication servers, and/or any other suitable devices. Those skilled in the art will understand that the components illustrated in FIG. 1 are exemplary and may vary by particular execution environment.

FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter for presenting information to a user; a network interface component, illustrated by a network interface adapter 114, for communicating via a network such as a LAN and/or WAN; and a communication mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs). Processor 104 may access machine code instructions and data via one or more memory address spaces in addition to the physical memory address space. A memory address space includes addresses identifying locations in a processor memory. The addresses in a memory address space are included in defining a processor memory. Processor 104 may have more than one processor memory. Thus, processor 104 may have more than one memory address space. Processor 104 may access a location in a processor memory by processing an address identifying the location. The processed address may be identified by an operand of a machine code instruction and/or may be identified by a register or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is referred to as a virtual processor memory or virtual memory. The term "processor memory" may refer to physical processor memory, such as processor memory 106, and/or may refer to virtual processor memory, such as virtual processor memory 118, depending on the context in which the term is used.

Physical processor memory 106 may include various types of memory technologies. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), RAMBUS DRAM (RDRAM), and/or XDR™ DRAM. Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated tangible computer readable storage media provide volatile and/or nonvolatile storage for computer-readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including an operating system 120, one or more applications 122, and other program code and/or data components illustrated by other libraries and subsystems 124. In an aspect, some or all software components may be stored in locations accessible to processor 104 in a shared memory address space shared by the software components. The software components accessed via the shared memory address space are stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Software components typically include instructions executed by processor 104 in a computing context referred to as a "process". A process may include one or more "threads". A "thread" includes a sequence of instructions executed by processor 104 in a computing sub-context of a process. The terms "thread" and "process" may be used interchangeably herein when a process includes only one thread.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such as a serial port, a parallel port, and/or a universal serial bus (USB) port. Input device adapter 110 receives input and provides a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. The terms "communication interface component" and "network interface component" are used interchangeably herein. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component.

Exemplary network interface components include network interface controller components, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component for operatively coupling the device to a network. Further, the terms "device" and "node" used herein may refer to one or more devices and nodes, respectively, providing and/or otherwise included in an execution environment unless clearly indicated otherwise.

The user-detectable outputs of a user interface are generically referred to herein as "user interface elements" or abbreviated as "UI elements". More specifically, visual outputs of a user interface are referred to herein as "visual interface elements". A visual interface element may be a visual output of a graphical user interface (GUI). Exemplary visual interface elements include windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes and radio buttons. An application interface may include one or more of the elements listed. Those skilled in the art will understand that this list is not exhaustive. The terms "visual representation", "visual output", and "visual interface element" are used interchangeably in this document. Other types of UI elements include audio outputs referred to as "audio interface elements", tactile outputs referred to as "tactile interface elements", and the like.

A visual output may be presented in a two-dimensional presentation where a location may be defined in a two-dimensional space having a vertical dimension and a horizontal dimension. A location in a horizontal dimension may be referenced according to an X-axis and a location in a vertical dimension may be referenced according to a Y-axis. In another aspect, a visual output may be presented in a three-dimensional presentation where a location may be defined in a three-dimensional space having a depth dimension in addition to a vertical dimension and a horizontal dimension. A location in a depth dimension may be identified according to a Z-axis. A visual output in a two-dimensional presentation may be presented as if a depth dimension existed allowing the visual output to overlie and/or underlie some or all of another visual output.

A "user interface (UI) element handler" component, as the term is used herein, includes a component of configured to send information representing a program entity for presenting a user-detectable representation of the program entity by an output device, such as a display. A "program entity" is an object included in and/or otherwise processed by an application or executable. The user-detectable representation is presented based on the sent information. Information that represents a program entity for presenting a user detectable representation of the program entity by an output device is referred to herein as "presentation information". Presentation information may include and/or may otherwise identify data in one or more formats. Exemplary formats include image formats such as raw pixel data, JPEG, video formats such as MP4, markup language data such as hypertext markup language (HTML) and other XML-based markup, a bit map, and/or instructions such as those defined by various script languages, byte code, and/or machine code. For example, a web page received by a user agent from a remote application provider may include HTML, ECMAScript, and/or byte code for presenting one or more UI elements included in a user interface of the remote application. Components configured to send information representing one or more program entities for presenting particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided for storing presentation information, which may include audio, visual, tactile, and/or other sensory data for presentation by and/or on an output device. For example, a buffer for storing an image and/or text string may be a presentation space as sensory information for a user. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

As used herein, the terms "program" and "executable" refer to any data representation that may be translated into a set of machine code instructions and may optionally include associated program data. The terms are used interchangeably herein. Program representations other than machine code include object code, byte code, and source code. Object code includes a set of instructions and/or data elements that either are prepared for linking prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. As used herein, the terms "application", and "service" may be realized in one or more executables and/or in one or more hardware components. The terms are used interchangeably herein.

As used herein, the term "network protocol" refers to a formal set of rules, conventions and data structures that governs how computers and other network devices exchange information over a network. The rules, conventions, and data structures are said to be specified or defined in a specification and/or schema.

The term "network path" as used herein refers to a sequence of nodes in a network that are communicatively coupled for transmitting data in one or more data units of a specified network protocol between a pair of nodes in the network.

A "data unit", as the term is used herein, is a data entity specified according to a network protocol for transmitting data contained in and/or otherwise identified by the data entity. A data unit is transmitted between a pair of nodes in a network path to send the data in and/or otherwise identified by the data unit from a source node to a destination node that includes a protocol endpoint of the network protocol. A network protocol explicitly and/or implicitly specifies and/or otherwise identifies a schema that defines one or more of a format for a valid data unit and a vocabulary for content of a valid data unit. One example of a data unit is an Internet Protocol (IP) packet. The Internet Protocol defines a format for an IP packet that defines a header for identifying a destination address that identifies a destination node and a payload portion for including a representation of data to be delivered to the identified destination node. The terms "data unit", "data packet", and "packet" are used interchangeably herein. One or more data units of a first network protocol may transmit a message of second network protocol. For example, one or more data units of the IP protocol may include a TCP message. In another example, one or more TCP data units may transmit an HTTP message.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units for transmitting to a next node in the network path. Portions of data received in several data units may be combined into a single data unit for transmitting by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the protocol. For example 192.168.1.1 is an IP protocol address represented in a human readable format that may be included in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

A node in a pair of nodes in a network path at one end of the sequence of nodes in the network path and/or the other end is referred to herein as a "path end node". Note that a node may have two NICs with one NIC at each end of a network path. A network path may be included as a portion of another network path that communicatively couples a same pair of nodes. Data may be transmitted via the sequence of nodes in a network path between path end nodes communicatively coupled via the network path. Data may be transmitted in one or both directions depending on an ordering of the nodes in the sequence.

"Path information" is any information that identifies a network path and/or hop path for data transmitted via one or more specified network protocols. Path information may be identified by identifying network interfaces, NICs, nodes, and/or hops included in a network path. "Address information" is any information that identifies a protocol address that, for a network protocol, identifies a protocol endpoint. Address information may identify a unicast protocol address for a network protocol. In identifying a protocol endpoint, a protocol address identifies a node and a network interface.

Those skilled in the art will understand upon reading the descriptions herein that the subject matter disclosed herein is not restricted to the network protocols described and/or their corresponding OSI layers. For ease of illustration, the subject matter is described in terms of protocols that correspond to OSI layer three, also referred to as network layer protocols, in general. Particular descriptions are based on versions of the Internet Protocol (IP). Address information may identify one or more protocol addresses. Exemplary protocol addresses include IP addresses, IPX addresses, DECNet addresses, VINES Internet Protocol addresses, and Datagram Delivery Protocol (DDP) addresses.

An "interaction", as the term is used herein, refers to any activity including a user and an object where the object is a source of sensory data detected by the user. In an interaction the user directs attention to the object. An interaction may also include the object as a target of input from the user. The input from the user may be provided intentionally or unintentionally by the user. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input component of the portable electronic device exemplifies the device, as an input target, receiving input from the user. Note that the user in providing input is detecting sensory information from the portable electronic device provided that the user directs sufficient attention to be aware of the sensory information and provided that no disabilities prevent the user from processing the sensory information. An interaction may include an input from the user that is detected and/or otherwise sensed by the device. An interaction may include sensory information that is detected by a user included in the interaction that is presented by an output device included in the interaction.

As used herein "interaction information" refers to any information that identifies an interaction and/or otherwise provides data about an interaction between a user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction. The term "operational component" of a device, as used herein, refers to a component included in performing an operation by the device.

Interaction information for one object may include and/or otherwise identify interaction information for another object. For example, a motion detector may detect user's head turn in the direction of a display of a portable electronic device. Interaction information identifying the user's head is facing the display may be received and/or used as interaction information for the portable electronic device indicating the user is receiving visual input from the display. The interaction information may serve to indicate a lack of user interaction with one or more other objects in directions from the user different than the detected direction, such as a person approaching the user from behind the user. Thus the interaction information may serve as interaction information for one or more different objects.

As used herein, any reference to an entity "in" an association is equivalent to describing the object as "identified" by the association, unless explicitly indicated otherwise.

As used herein, the term "communication" refers to information including a message sent and/or for sending via a network between communicants. A message may include text data, audio data, and/or image data. The term "communicant" as used herein refers to a user included in a communication as a sender and/or a receiver of the information. A communicant is represented by a "communications agent" configured to operate in an execution environment to send data to and/or receive data from another communications agent, on behalf of the represented communicant, according to a communications protocol via network. A communications protocol defines and/or otherwise identifies an address space including communications addresses for delivering data sent in a communication from one communications agent to another. A communications protocol is a type of network protocol.

The term "communicant alias" as used herein refers to an identifier of a communicant in a communication where the communicant alias is not a communications address included in an address space of a communications protocol for sending and/or receiving data in the communication.

The term "attachment" as used herein refers to a portion of a communication that includes data from one communicant to another other than data in the message portion. A resource sent as an attachment is data that is typically not presented "inline" or in a message included in a message portion of a communication. Email attachments are perhaps the most widely known attachments included in communications. An email attachment is a file or other resource sent along with an email in a portion of the email separate from a message portion. As defined, other types of text communications as well as voice and video communications may include mount descriptor portions. A communication may include one or more resources as one or more attachments.

The terms "contactor" and "contactee" identify roles in a communication. A "contactor" provides information for identifying a "contactee" in a communication. A contactee may be included in a communication by a contactor and/or the contactor's communications agent. A contactor and/or a contactee are roles of a user or communicant of a communications agent and may be a living being, a node, a component, and/or an application. Both a contactor and a contactee are communicants in a communication.

The term "data object" as used herein refers to an entity, identifiable within a data store, for storing and/or accessing data. Exemplary data stores include file systems, directory service including DNS and LDAP, and data bases including relational databases and hierarchical databases, to name a few examples. Exemplary data objects include files and folders in a file system. Accessing a data object includes one or more of accessing data in the data object and accessing metadata, maintained by the data store, about the data object.

Figure 2A:
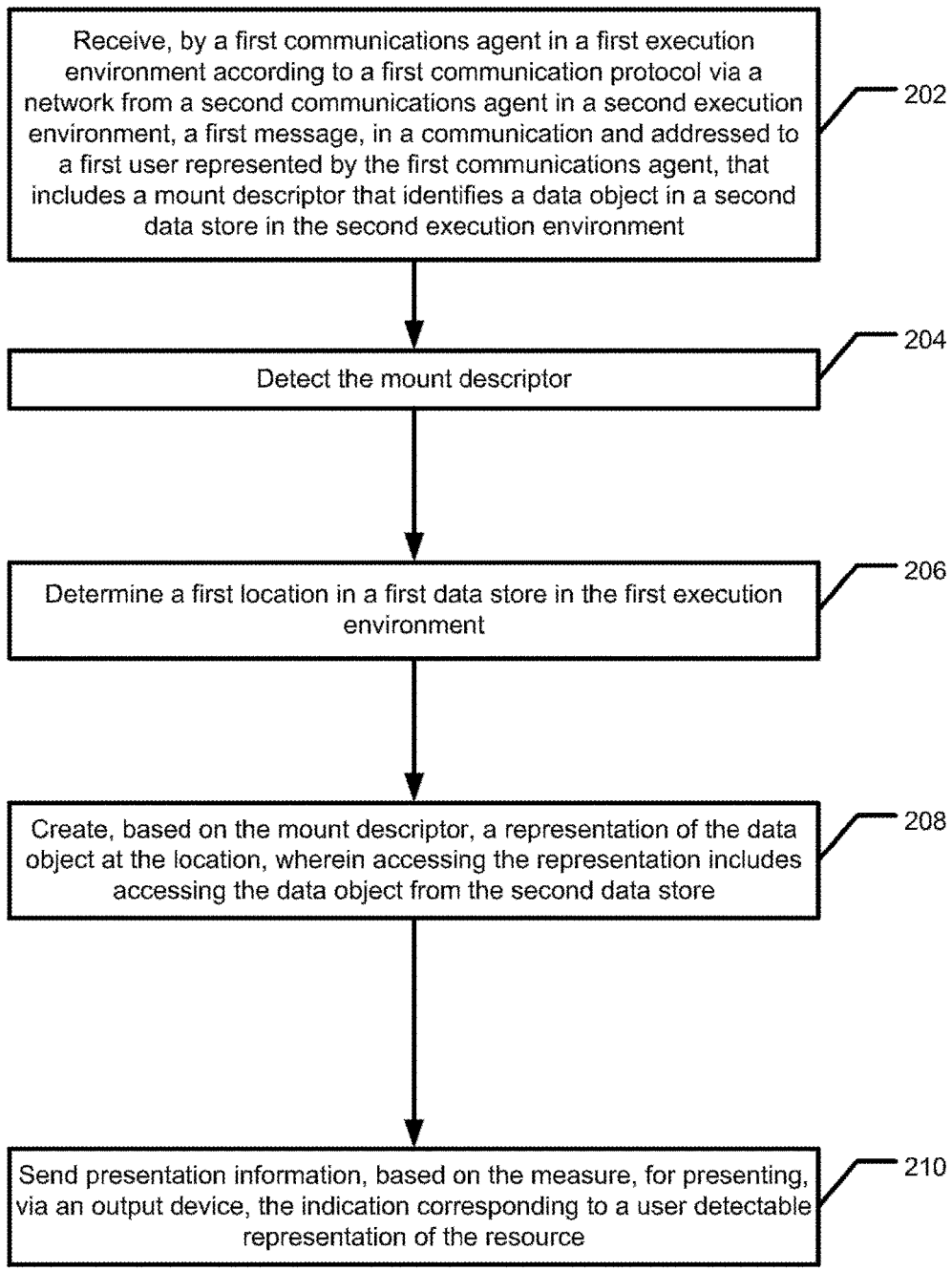
FIG. 2A is a flow diagram illustrating a method for sharing a data object in a data store via a communication according to an aspect of the subject matter described herein.
Figure 2B:
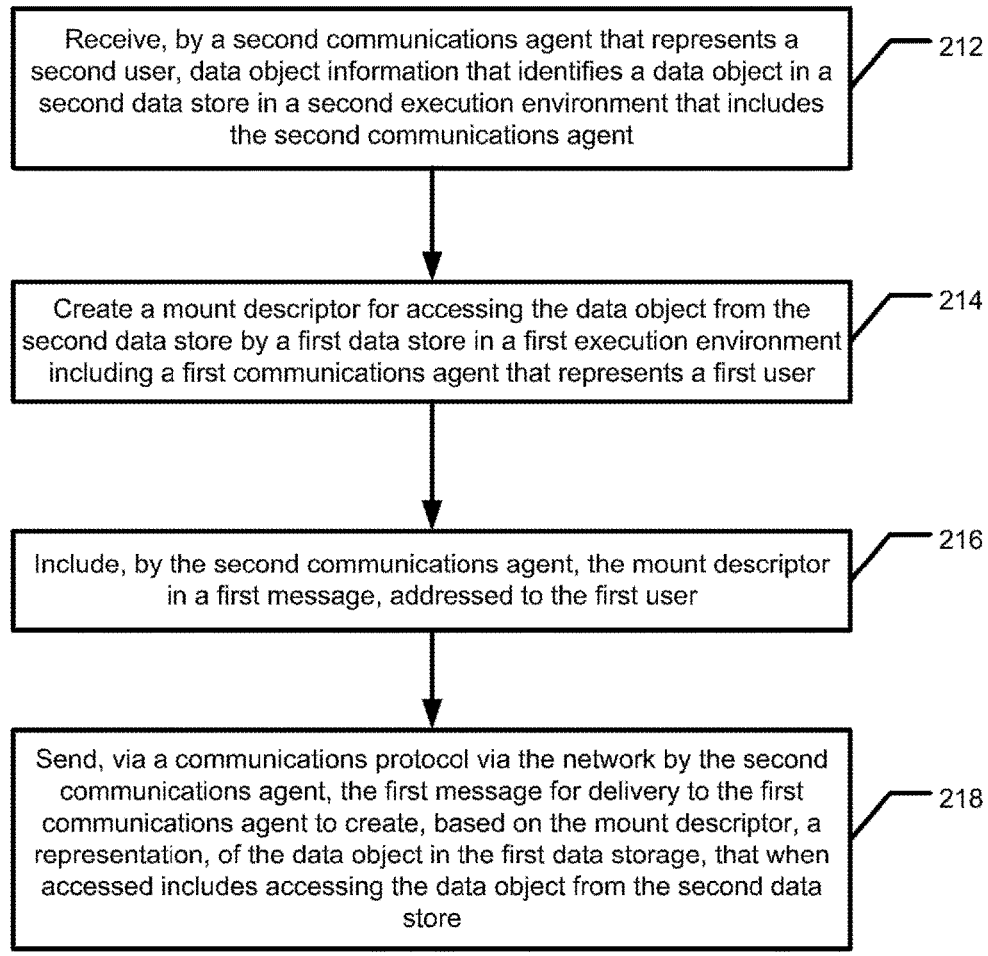
FIG. 2B is a flow diagram illustrating a method for sharing a data object in a data store via a communication according to an aspect of the subject matter described herein.
Figure 3A:
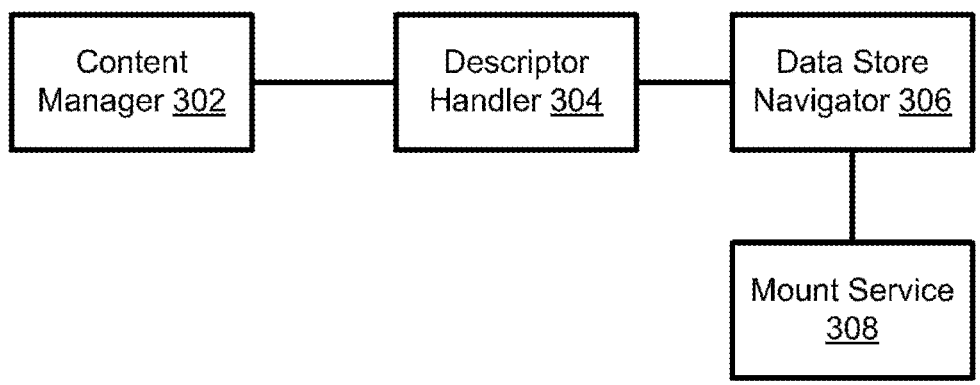
FIG. 3A is a block diagram illustrating an arrangement of components for sharing a data object in a data store via a communication according to another aspect of the subject matter described herein.
Figure 3B:
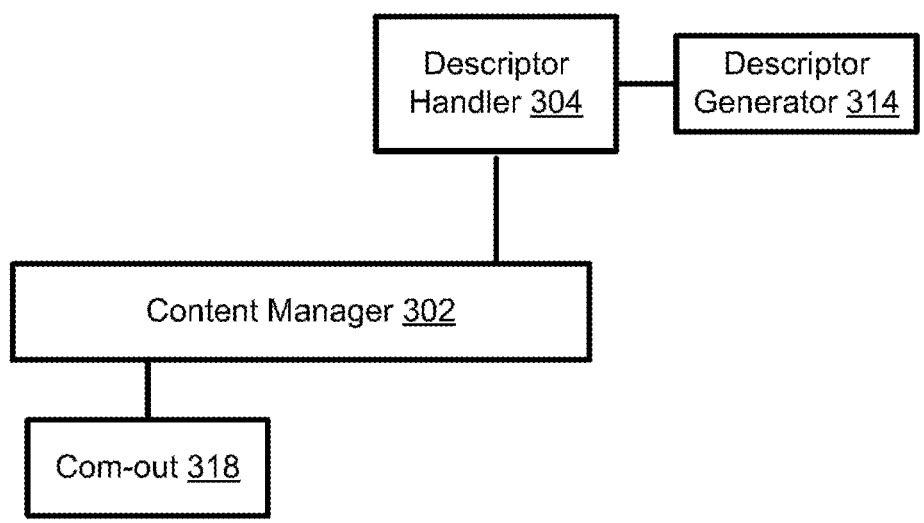
FIG. 3B is a block diagram illustrating an arrangement of components for sharing a data object in a data store via a communication according to another aspect of the subject matter described herein.

FIG. 3A illustrates an arrangement of components in a system that operates in an execution environment, such as execution environment 102 in FIG. 1. The arrangement of components in the system operates to perform the method illustrated in FIG. 2A. The system illustrated includes a content manager component 302, a descriptor handler component 304, a data store navigator component 306, and a mount service component 308. A suitable execution environment includes a processor, such as processor 104, to process an instruction in at least one of a content manager component, a descriptor handler component, and a data store navigator component, and a mount service component. FIG. 3B illustrates an arrangement of components in a system that operates to perform the method illustrated in FIG. 2B. The system illustrated includes a descriptor handler component 304, a descriptor generator component 314, a content manager component 302, and a com-out component 318. A suitable execution environment includes a processor, such as processor 104, to process an instruction in at least one of a descriptor handler component, a descriptor generator component, a content manager component, and a com-out component.

Some components, illustrated in the drawings are identified by numbers with an alphanumeric suffix. A component may be referred to generically in the singular or the plural by dropping a suffix of a portion thereof of the component's identifier. For example, window UI elements, such as a window UI element 602a in FIG. 6A, a window UI element 602a in FIG. 6A, and their adaptations and analogs; are referred to herein generically as a window UI element 602 or window UI elements 602 when describing more than one. Other components identified with an alphanumeric suffix may be referred to generically or as a group in a similar manner.

Figure 4:
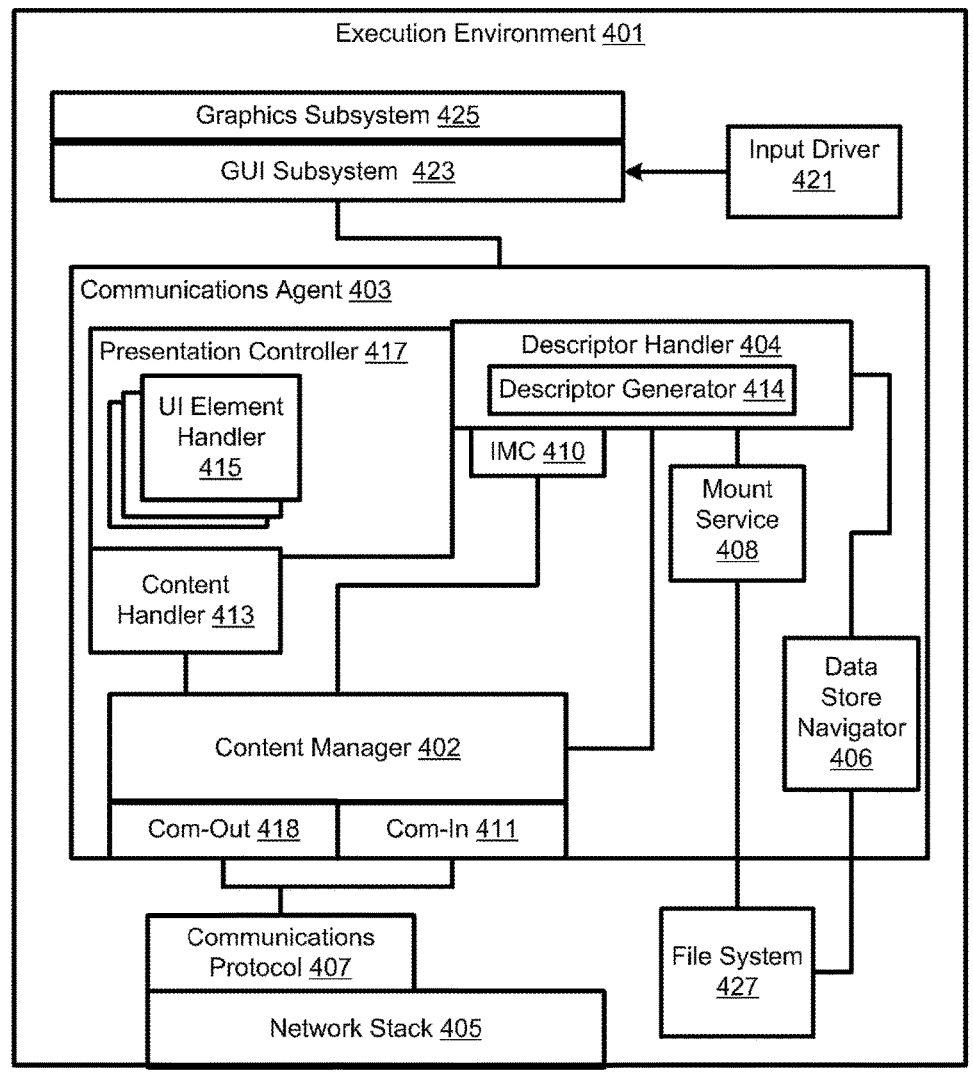
FIG. 4 is a block diagram illustrating an arrangement of components for sharing a data object in a data store via a communication according to another aspect of the subject matter described herein.

The arrangement of components illustrated in FIG. 4 may be adapted to operate in a number of execution environments to perform the method illustrated in FIG. 2A and/or the method illustrated in FIG. 2B. FIG. 4 is a block diagram illustrating the components of FIG. 3A, FIG. 3B, and/or analogs of the components of FIG. 3A and FIG. 3B, respectively adapted to operate in an execution environment 401 that includes and/or otherwise is provided by one or more nodes. FIG. 1 illustrates key components of an exemplary device that may at least partially provide and/or otherwise be included in an execution environment. The components illustrated in FIG. 4 may be included in or otherwise combined with the components of FIG. 1 to create a variety of arrangements of components according to the subject matter described herein.

As stated, the various adaptations and analogs of the arrangement in FIG. 3A as well as the various adaptations and analogs of the arrangement in FIG. 3B illustrated and described herein are not exhaustive. For example, those skilled in the art will see based on the description herein that arrangements of components for performing the method illustrated in FIG. 2A and the method illustrated in FIG. 2B may each be distributed across more than one node and/or execution environment. For example, such arrangements may operate at least partially in a browser in a one execution environment and at least partially in a server in another execution environment interoperating via a network.

Figure 5:
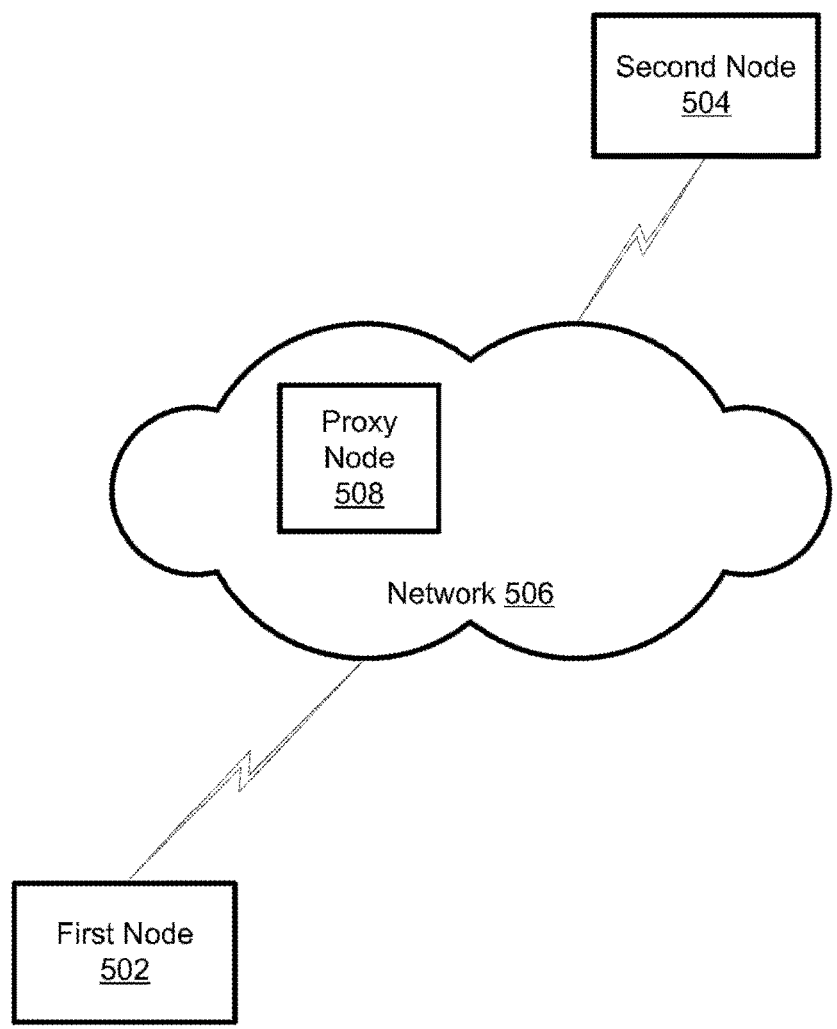
FIG. 5 is a network diagram illustrating a system for sharing a data object in a data store via a communication according to another aspect of the subject matter described herein.

FIG. 5 illustrates a first node 502 and a second node as exemplary devices that each may be included in and/or otherwise adapted for providing an instance, adaptation, and/or analog of execution environment 401 in FIG. 4. As illustrated in FIG. 5, first node 502 and a second node 504 are operatively coupled to a network 506 via respective network interface components enabling execution environment 401 of first node 502 and execution environment 401 of second node 504 to exchange data in a communication on behalf of communicants represented by the respective nodes.

FIG. 4 illustrates a communications agent 403 including an adaptation of the arrangement of components in FIG. 3A and an adaptation of the arrangement of components in FIG. 3B. A first communications agent 403 may operate, in execution environment 401 of first node 502, on behalf of a first communicant to communicate with a second communicant represented by a second communications agent 403 operating in execution environment 401 of second node 504.

An execution environment 401 is illustrated in FIG. 4 hosting communications agent 403. Components in FIG. 4 are referenced for illustrative purposes in describing communications agents operating in an execution environment of first node 502 and an execution environment 401 of second node 504. Exemplary communications agents include email clients, phone clients including Voice over Internet Protocol (VoIP) clients, instant messaging clients, short message service (SMS) clients, multimedia message service (MMS clients), multi-media communications clients including video phone clients, and other data transfer agents.

Communications agents 403 such as illustrated in FIG. 4, respectively operating in execution environment 401 of first node 502 and in execution environment 401 of second node 504 in FIG. 5 may interoperate via respective network stacks 405. Communications agents 403 may communicate via one or more communications protocols. FIG. 4 illustrates communications protocol component 407 exemplifying a subsystem for exchanging data via network 506 according to one or more communications protocols, such as simple mail transfer protocol (SMTP), an instant messaging protocol, and/or a real-time voice and/or video protocol. A communication between communications agents 403 in execution environment 401 of first node 502 and execution environment 401 of second node 504 may include more than one type of data and may use one or more communications protocols in exchanging one or more types of data via network 506.

Instances, adaptations, and/or analogs of communications agent 403 in FIG. 4, in execution environment 401 of first node 502 and in execution environment 401 of second node 504, respectively, may communicate via discrete messages, a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, and/or a secure protocol, to name a few communications options.

FIG. 4 illustrates communications agent 403 including a content manager component 402. Content manager component 402 may interoperate with communications protocol layer component 407 and/or network stack 405 to receive data in one or more communications via network 506 with another communications agent in another node. Content manager component 402, in FIG. 4, is operatively coupled, via com-in component 411, to communications protocol component 407 and operates to receive the data from the other node.

Data received in a communication may include one or more data portions having respective content types. Exemplary content types include plain text, markup such as hypertext markup language (HTML), audio data, image data, and/or executable data. Executable data may include script instruction(s), byte code, and/or machine code. In FIG. 4, communications agent 403 includes one or more content handler components 413 to process data received according to its content type. A data type may be identified by a MIME type identifier. Exemplary content handler components 413 include text/html content handler components for processing HTML representations; application/xmpp-xml content handler components for processing extensible messaging and presence protocol (XMPP) streams including presence tuples, instant messages, and audio content handlers including and/or configured to retrieve suitable codices; video content handler components for processing video representations of various types; and still image data content handler components for processing various image data representations.

Content handler component(s) 413 process received data representations and may provide transformed data from the representations to one or more user interface element handler components 415. One or more user interface element handler components 415 are illustrated in a presentation controller component 417 in FIG. 4. Presentation controller component 417 may manage visual, audio, and other types of output for its including application as well as receive and route detected user and other inputs to components and extensions of its including application, communications agent 403. A user interface element handler component 415 may be adapted to operate at least partially in a content handler component 413 such as a text/html content handler component and/or a script content handler component. Additionally or alternatively, a user interface element handler component in an execution environment 401 may be received in a communication. For example, a communication, such as an email, may include an HTML content type portion and a script content type portion.

FIGS. 6A-H illustrate various user interfaces, some of which include window UI elements 602 presentable in a presentation space of a display device, such as output device 130 in FIG. 1. A window UI element 602 may include a contactor UI element 604 for presenting an identifier of a communicant in the role of a contactor in a communication represented by the window UI element 602. A window UI element 602 may also include a contactee UI element 606 for presenting one or more contactee identifier(s) identifying one or more communicants in the role of contactee(s) in the communication. A presentation space 608 may be included in each window UI element 602 for presenting a user message UI element 610 that my present a user message from one user to another. A presentation space 608 may also be provided for presenting one or more UI elements that correspond to user inputs for exchanging data in and/or otherwise managing a communication.

Data to send in a communication to a communications agent in execution environment 401 of second node 504 may be received by one or more content handler component(s) 413 operating in execution environment 401 of first node 502 to transform the data into one or more data representations suitable for transmitting in the communication and/or suitable for processing by the communications agent in execution environment 401 of second node 504. The one or more data representations may be provided to content manager component 402 for sending in the communication to execution environment 401 of second node 504. Content manager component 402 may package the one or more data representations in a message formatted according to a communications protocol of the communications agent. Communications protocol component 407 may send the data according to the specification(s) of the communications protocol. Content manager component 402 may alternatively or additionally encode and/or otherwise transform one or more of the data representations so that the data may be sent in a data stream such as voice stream and/or a video stream in the communication to a communications agent via a network.

Content manager component 402 operating in execution environment 401 included in and/or otherwise provided by a node, such as execution environment 401 of first node 502, may provide the packaged, encoded, and/or transformed data to communications protocol component 407 via a com-out component 418. Com-out component 418 as described above operatively couples communications agent 402 to communications protocol component 407 according to an interface provided by communications protocol component 407 to send data in a communication according to a communications protocol. Communications protocol component 407 may further package and/or otherwise transform the data to send via network stack 405 for delivery via network 506 to another node, such as second node 504.

As described above, a communications protocol may operate via one or more nodes in a network in a network path communicatively coupling a first node and a second node. Exemplary path nodes include mail relay nodes, phone switch nodes, and proxy nodes such as instant messaging proxies for communicating through firewalls. As indicated, proxy node 508 may operate as a path node.

A contactee is identified for sending data in a communication. A contactee may be represented by a communications address in an address space of a communications protocol. In one aspect, information identifying a communications address may be received from a communicant of a communications agent in an execution environment. In FIG. 4, presentation controller 417 and/or a UI element handler 415, presenting and/or managing interaction with contactor UI element 604a in FIG. 6A for execution environment 401 of first node 502, may receive a contactor alias in response to a user input corresponding to UI element handler 415. The user/communicant of execution environment 401 of first node 502 may enter a contactor alias, such as "William", via a keyboard and/or select a predefined communicant alias presented in a selection UI control element via a UI element handler component 415. The user input may be detected by input driver 421. Corresponding input information may be routed to presentation controller 417 by GUI subsystem 423. GUI subsystem 423 operates to send presentation information to a display device via a graphics subsystem 425. Communication agent 403 may identify a communication address associated with the contactor alias, "William". Other communications address, such as for one or more contactees, may be received similarly and/or in any suitable manner. In an aspect, one or more contactor and/or contactee identifiers may be determined automatically.

Data may be sent in a communication according to a form or type of the communication and/or other attribute of the communication such as a security attribute, the amount of data to be sent, a priority setting, a task setting, and the like. Some forms of communication do not require a session and/or a connection between nodes representing communicants in the communication in order to send data between and/or among the nodes, while other forms of communication do. An email and/or instant message may use a store and forward model of delivery.

Figure 6A:
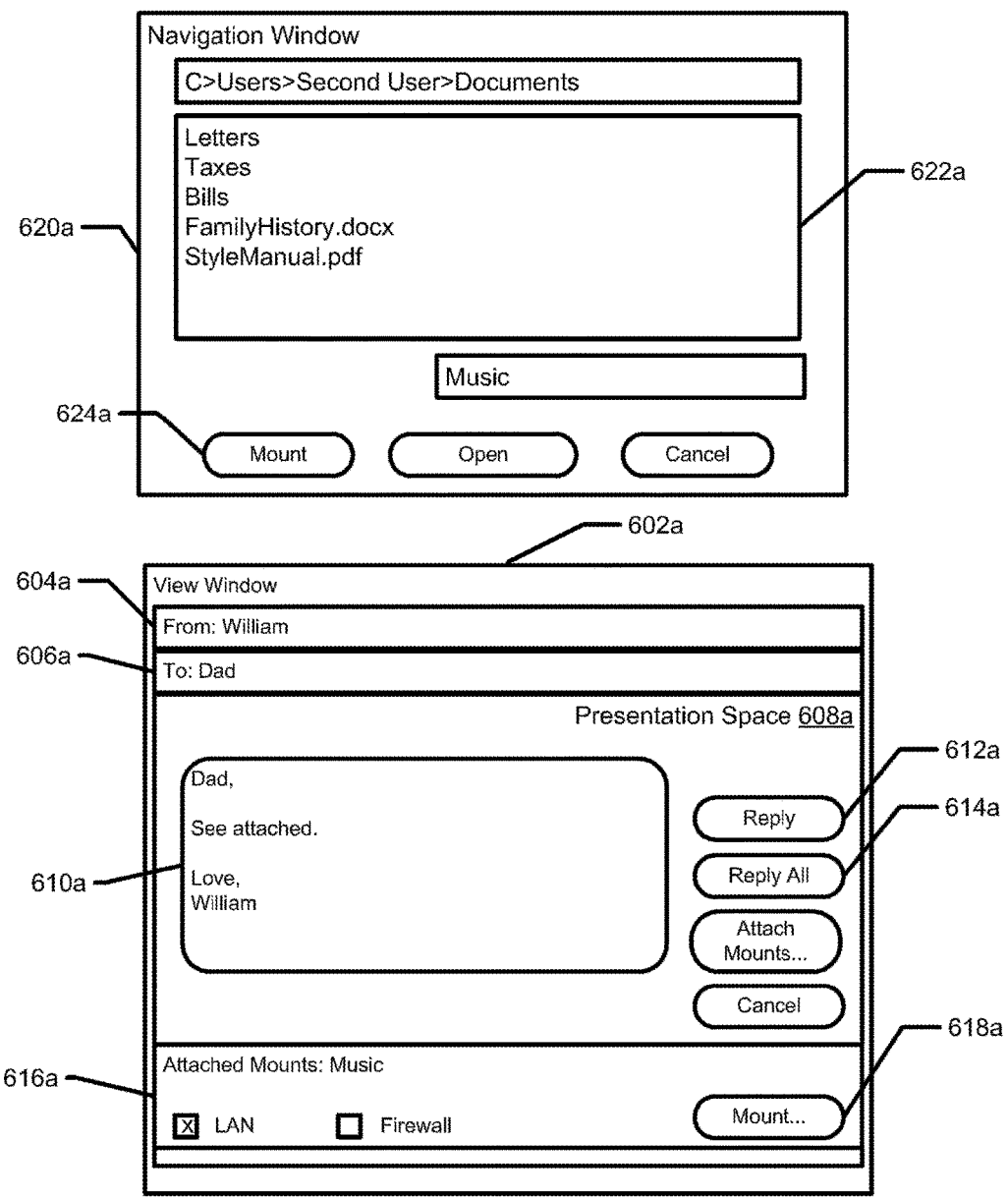
FIG. 6A is a diagram illustrating a user interface presented via a display according to another aspect of the subject matter described herein.

Data may be sent in a communication in response to a communicant input. In FIG. 6A a contactor may provide an input corresponding to reply UI element 612a in FIG. 6A. The input may be received by presentation controller component 417 and/or one or more UI element handlers 415 corresponding to reply UI element 612a. In response to detecting the input, presentation controller component 417 may provide data to be sent in the communication to one or more content handler components 413 according to the content type(s) of the data to be sent.

The one or more content handler components 413 may encode, format, and/or otherwise transform the data for sending in a message, such as an email message. The one or more content handler components 413 may provide data to be sent to content manager 402, instructing content manager component 402 to send the data in the communication for delivery to a communications agent in execution environment 401 of second node 504. Content manager component 402 interoperating with com-out component 418 may further format and/or transform the data for sending in the communication according to a communications protocol, for example according to an email communications protocol, by communications protocol component 407. Communications protocol component 407 may send the communication for delivery to the communications agent in execution environment 401 of second node 504 via network 506.

One or more path nodes may relay data sent in the communication between execution environment 401 of first node 502 and execution environment 401 of second node 504. A path node may determine a next node and/or a network interface in a network path communicatively coupling execution environment 401 of first node 502 and execution environment 401 of second node 504 for exchanging data in a communication between communication agents 403 in the respective execution environments 401 of first node 502 and second node 504.

For session-oriented and/or connection-oriented communication a session and/or connection may be established if a session/connection has not already been established. Data may be sent for delivery to a communications agent identified based on a contactee communications address during session and/or connection setup. For example, for a voice communication a voice communication may be established via a session initiation protocol. Communications protocol component 407 may operate according to the session initiation protocol specifications. Communications protocol component 407 operating in execution environment 401 of execution environment 401 of first node 502 may locate a communications agent by communicating with one or more nodes in network 506 according to the session initiation protocol. Communications protocol component 407 may locate a communications agent in execution environment 401 of second node 504, based on a communications address for the contactee.

Once a communication session is established, such as a voice session, data may be sent according to the session communications protocol, such as RTP. Data may be sent according to the session initiation protocol in the communication for managing the voice communication session and/or for exchanging text, image, and/or other data outside of the voice session. One or more path nodes may be included in session and/or connection setup. Alternatively or additionally, one or more path nodes may be included in a network path in a session and/or connection.

With reference to FIG. 2A, a block 202 illustrates that the method includes receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment. Accordingly, a system for sharing a data object in a data store via a communication includes means for receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment. For example, the arrangement in FIG. 3A, includes content manager component 302 that is operable for receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment. FIG. 4 illustrates content manager component 402 as an adaptation and/or analog of the content manager component 302 in FIG. 3A. One or more content manager components 402 operate in an execution environment 401. The system for sharing a data object in a data store via a communication includes one or more processors and logic encoded in one or more tangible media for execution by the one or more processors that when executed is operable for receiving, by a first communications agent in a first execution environment according to a first communication protocol via a network from a second communications agent in a second execution environment, a first message, in a communication and addressed to a first user represented by the first communications agent, that includes a mount descriptor that identifies a data object in a second data store in the second execution environment.

Figure 7:
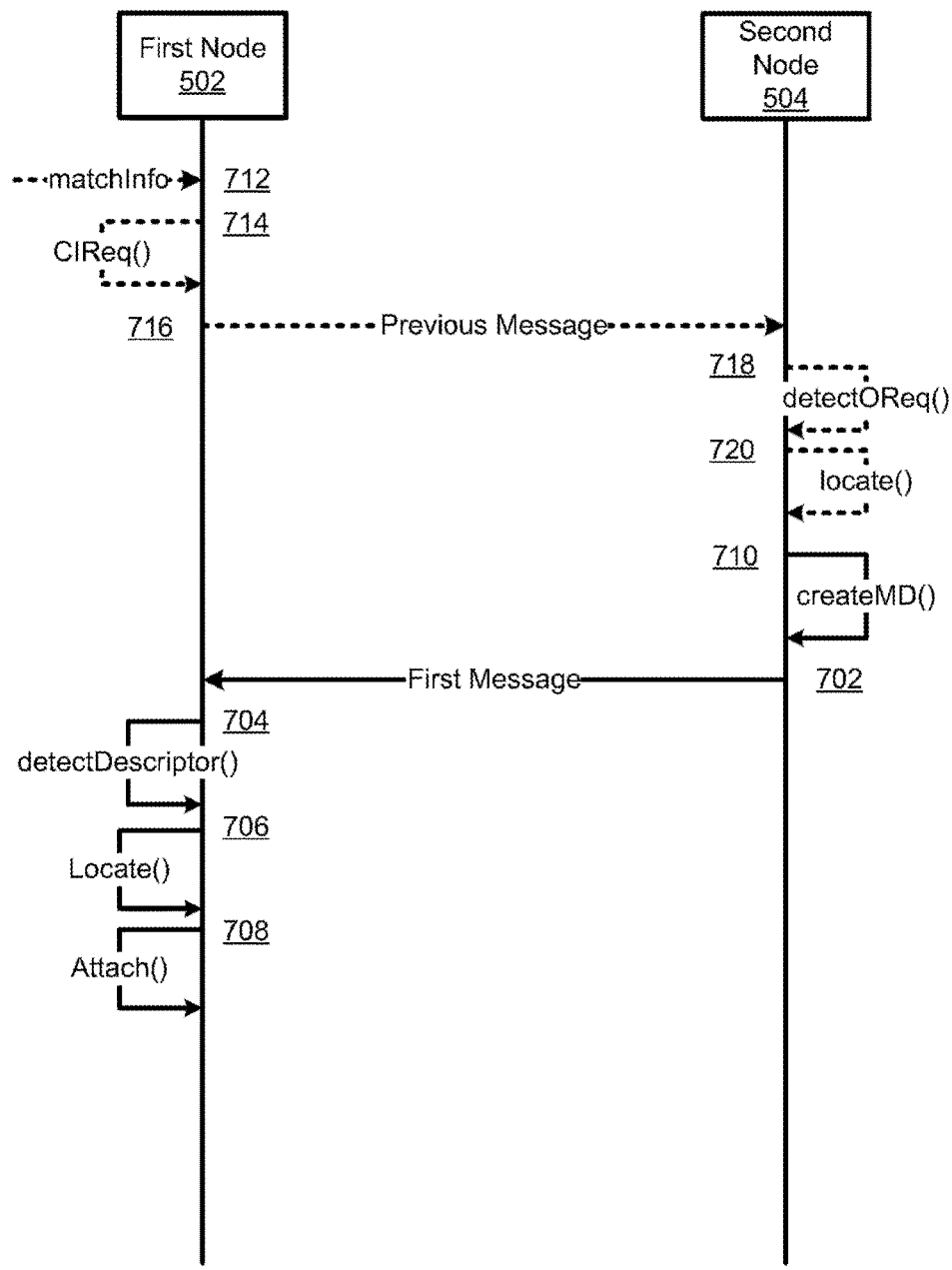
FIG. 7 is a message flow diagram illustrating an exemplary data and execution flow for sharing a data object in a data store via a communication according to an aspect of the subject matter described herein.

FIG. 7 includes a data flow message that illustrates a first message 702, including a mount descriptor, received via network 506 by execution environment 401 including and/or otherwise provided by first node 502. First message 702 is sent via a communications protocol by a communications agent 403 in execution environment 401 including and/or otherwise provided by second node 504.

First message 702 imay be addressed to a user of execution environment 401 of first node 502 by a communications address, that identifies the user, from an address space of the communications protocol. First message may be from a user, identified by a communications address in the address space of the communications protocol and represented by communications agent 403 in of execution environment 401 of second node 504. The communications protocol may include a protocol specified for exchanging at least one of an email, an instant message, a short messaging service message (SMS), a multi-media message (MMS), an audio message, a video message, and an attachment. First message 702 may include a user readable message from the user of execution environment 401 of second node 504. Receiving first message 702 may include detecting the mount descriptor in first message 702 along with the user readable message.

As described above, content manager component 402 operating in execution environment 401 of first node 502 may interoperate with communications protocol layer component 407 and/or network stack 405 to receive data in one or more communications via network 506 with another communications agent in another node. A communication may be direct and/or indirect, such via an email relay. Content manager component 402 in FIG. 4 operatively couples one or more content handler components 413 with network 506, via com-in component 411, communications protocol component 407, and/or network stack 405 to receive and process the data from the other execution environment of the other node. Thus, content manager component 402 operating in execution environment 401 of first node 502 may receive data, such as sent via first message 702, which includes a mount descriptor. FIG. 8A includes an exemplary content portion 800a of an email message. Content portion 800a includes a user readable message portion 802a and a mount descriptor portion 804a described in more detail below. The received communication may include a message addressed to a user represented by communications agent 403 in execution environment 401 of first node 502.

Returning to FIG. 2A, a block 204 illustrates that the method further includes detecting the mount descriptor. Accordingly, a system for sharing a data object in a data store via a communication includes means for detecting the mount descriptor. For example, the arrangement in FIG. 3A, includes descriptor handler component 304 that is operable for detecting the mount descriptor. FIG. 4 illustrates descriptor handler component 404 as an adaptation and/or analog of descriptor handler component 304 in FIG. 3A. One or more descriptor handler components 404 operate in an execution environment 401. The system for sharing a data object in a data store via a communication includes one or more processors and logic encoded in one or more tangible media for execution by the one or more processors that when executed is operable for detecting the mount descriptor. In FIG. 4, descriptor handler component 404 is illustrated as a component of communications agent 403.

FIG. 7 includes a data flow that illustrates a detect descriptor data flow 704 that may be internal to execution environment 401 of first node 502 and/or that may include a message received via network 506 by first node 502. In an aspect, detect descriptor data flow 704 may illustrate a data flow to descriptor handler component 404 operating in execution environment 401 of first node 502. A mount descriptor may be identified to and/or otherwise provided to descriptor handler component 404. Content handler component 402, operating as described with respect to block 202 of FIG. 2A, may identify and/or otherwise provide a mount descriptor to a descriptor handler component 404.

Content manager component 402 may provide some or all of the data in a received message, such as first message 702, to descriptor handler component 404. Descriptor handler component 404 may identify and/or otherwise detect a mount descriptor in the message sent from the execution environment 401 of second node 504. Content manager component 402 may interoperate with descriptor handler component 404 in identifying the mount descriptor. The mount descriptor may be identified for processing by descriptor handler component 404 by content manager component 402 according to a schema for the message. For example, a portion of an email message may include a MIME-type identifier that identifies a corresponding part of the email as a mount descriptor and/or otherwise identifies the part for routing to descriptor handler component 404 in communications agent 403 in execution environment 401 of first node 502.

Returning to FIG. 2A, a block 206 illustrates that the method yet further includes determining a first location in a first data store in the first execution environment. Accordingly, a system for sharing a data object in a data store via a communication includes means for determining a first location in a first data store in the first execution environment. For example, the arrangement in FIG. 3A, includes data store navigator component 306 that is operable for determining a first location in a first data store in the first execution environment. FIG. 4 illustrate data store navigator components 406 as an adaptations and/or analogs of data store navigator component 306 in FIG. 3A. One or more data store navigator components 406 operate in an execution environment 401. The system for sharing a data object in a data store via a communication includes one or more processors and logic encoded in one or more tangible media for execution by the one or more processors that when executed is operable for determining a first location in a first data store in the first execution environment. In FIG. 4, a data store navigator component 406 is illustrated as a component of application 403.

FIG. 7 includes a data flow message that illustrates a locate data flow 706 that may be internal to execution environment 401 of first node 502 and/or that may include a message received via network 506 by first node 502. Locate data flow 706, in an aspect, illustrates a data flow to data store navigator component 406 operating in execution environment 401 of first node 502. Data store navigator component 406 may be invoked automatically in response to detecting a mount descriptor. In another aspect, data store navigator component 406 may be invoked in response to a user input.

FIG. 6A illustrates a view window UI element 602a as an exemplary user interface that may be presented by communications agent 403 operating in execution environment 401 of first node 502 to present data received in a communication, such as first message 702, from execution environment 401 of second node 504. FIG. 6A illustrates a contactor UI element 604a, a contactee UI element 606a, and a presentation space 608a of the view window UI element 602a. Presentation space 608a includes a user message UI element 610a. The various UI elements may be presented by one or more UI element handler components 415 in communications agent 403 in execution environment 401 of first node 502. A reply UI element 612a and a reply all UI element 614a illustrate UI elements in presentation space 608a presented to allow a user of the execution environment 401 of first node 502 to respond and/or otherwise instruct execution environment 401 of first node 502 to perform an operation based on the message received in the communication. FIG. 6A illustrates an attached mounts UI element 616a identifying, based on the mount descriptor in first message 702, a "Music" folder as a mountable folder from a data store of execution environment 401 of second node 504.

In an aspect, determining a location in a data store for creating a representation of a data object may include presenting a navigation UI element for navigating the data store. The location may be determined in response to detecting a user input identifying the location. View window UI element 602a in FIG. 6A includes a mount UI element 618a for receiving user input to display a navigation window UI element 620a for identifying a location in a data store of execution environment 401 of first node 502 to mount and/or otherwise attach the remote "Music" folder identified in the mount descriptor. In response to an input directed to mount UI element 618a, a corresponding UI element handler 415 may interoperate with data store navigator component 406 to present navigation window UI element 620a that includes a presentation space 622a for presenting a user detectable representation of one or more locations in a data store of execution environment 401 of first node 502.

FIG. 6A illustrates a mount UI element 624a allowing a user to provide user input(s) to instruct communications agent 403 in execution environment 401 of first node 502 to request that a data object identified in the mount descriptor be attached to a location, identified in navigation window UI element 602b, in the data store in execution environment 401 of first node 502.

In another aspect, files and/or other data entities identified in a mount descriptor may be illustrated in a manner similar to attachments rather than in a separate UI element as in FIG. 6A. Creating a representation of a data object may include receiving an indication by a communications agent to access the data object identified by a mount descriptor. In response, a location in a data store for creating the representation may be determined automatically. Further, in response to receiving the indication the representation may be created automatically at the location. Still further, in response to receiving the indication, the data object may be accessed via the network based on the mount descriptor.

Figure 6B:
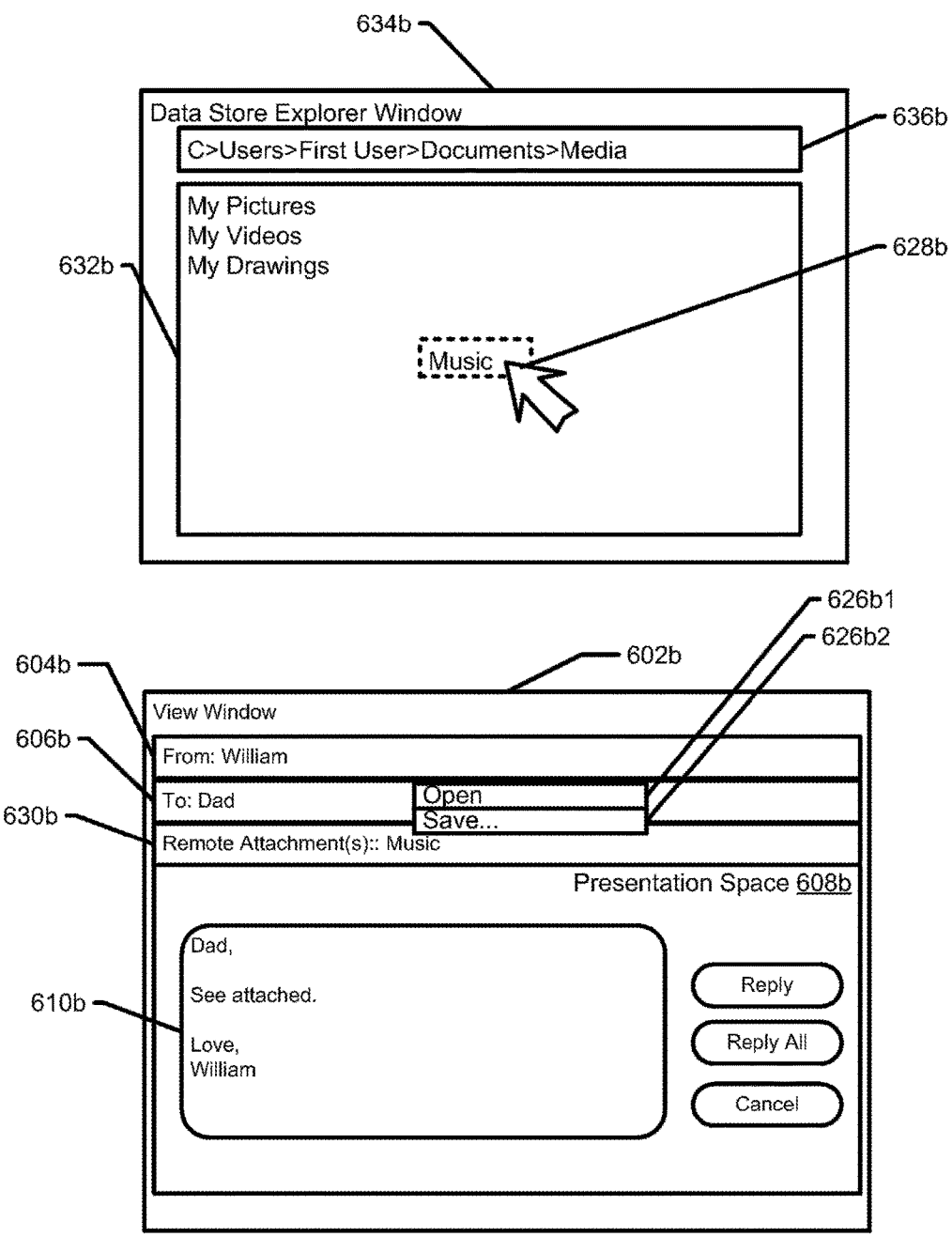
FIG. 6B is a diagram illustrating a user interface presented via a display according to another aspect of the subject matter described herein.

In response to detecting the mount descriptor in first message 702, execution environment 401 of first node 502 may present a view window UI element 602b in FIG. 6B including data received in the first message 702 to a user of execution environment 401 of first node 502 as described with respect to FIG. 6A. Context menu 626b provides UI elements to allow the user to instruct execution environment 401 of first node 502 to retrieve a data object, in response to an input corresponding to "Open" menu UI element 626b1, identified in a mount descriptor received from execution environment 401 of second node 504. Context menu 626b provides UI elements to allow the user to instruct execution environment 401 of first node 502 to attach and/or otherwise mount a representation of a data object, in response to an input corresponding to "Save . . . " menu UI element 626b2, identified in a mount descriptor at a location in the data store of execution environment 401 of first node 502.

Alternatively or additionally, a location for creating representation of a data object may be determined by detecting user input included in performing a drag and drop operation on a representation of the data object presented via an output device. The drag and drop operation may be performed to attach a data object identified in a received mount descriptor to create a representation of the data object at a location in a data store. FIG. 6B includes a pointer UI element 628b dragging a representation of the "Music" folder from remote attachments UI element 630b in view window UI element 602b. The representation of the "Music" folder is shown over a listing pane 632b, in a navigation window UI element 634b, showing data entities in the data store of execution environment 401 of first node 502 at a location identified in a path UI element 636b.

Figure 6C:
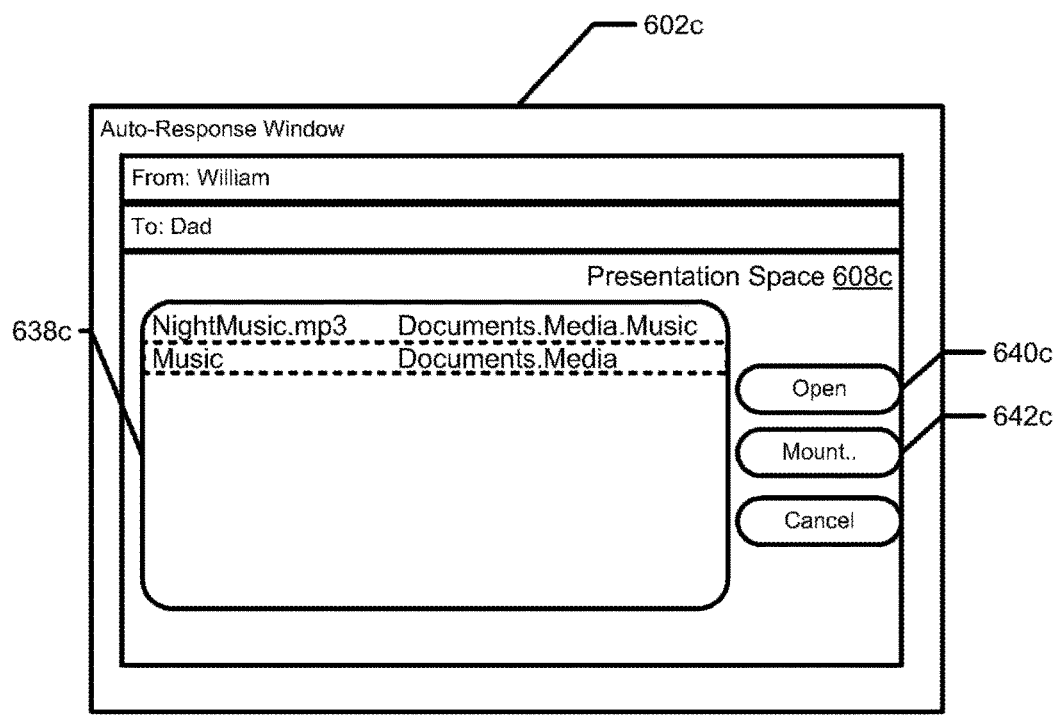
FIG. 6C is a diagram illustrating a user interface presented via a display according to another aspect of the subject matter described herein.

FIG. 6C illustrates another exemplary user interface that execution environment 401 of first node 502 may present to the user to allow the user to instruct execution environment 401 of first node 502 to mount and/or otherwise attach a representation of a data object identified in a mount descriptor to a location in a data store of execution environment 401 of first node 502. Auto-response window 602c may be presented in response to a mount descriptor received in a communication without a user message. Rather than a UI element for displaying a user message, a remote data object pane UI element 638c may be presented that identifies data objects located and/or otherwise identified by execution environment 401 of second node 504 in a mount descriptor received by execution environment 401 of first node 502. UI elements in presentation space 608c are illustrated that allow a user to instruct execution environment 401 of first node 502 to retrieve a data object, in response to an input corresponding to "Open" UI element 640c, identified in a mount descriptor received from execution environment 401 of second node 504. Mount UI element 642c allows the user to instruct execution environment 401 of first node 502 to attach and/or otherwise mount a representation of a data object, identified in a mount descriptor at a location in the data store of execution environment 401 of first node 502.

Returning to FIG. 2A, a block 208 illustrates that the method yet further includes creating, based on the mount descriptor, a representation of the data object at the location, wherein accessing the representation includes accessing the data object from the second data store. Accordingly, a system for sharing a data object in a data store via a communication includes means for creating, based on the mount descriptor, a representation of the data object at the location, wherein accessing the representation includes accessing the data object from the second data store. For example, the arrangement in FIG. 3A, includes mount service component 308 that is operable for creating, based on the mount descriptor, a representation of the data object at the location, wherein accessing the representation includes accessing the data object from the second data store. FIG. 4 illustrates mount service component 408 as an adaptation and/or analog of mount service component 308 in FIG. 3A. One or more mount service components 408 operate in an execution environment 401. The system for sharing a data object in a data store via a communication includes one or more processors and logic encoded in one or more tangible media for execution by the one or more processors that when executed is operable for creating, based on the mount descriptor, a representation of the data object at the location, wherein accessing the representation includes accessing the data object from the second data store. In FIG. 4, a mount service component 408 is illustrated as a component of data store navigator component 406.

FIG. 7 includes data flow message that illustrates an attach data flow 708 that may be internal to execution environment 401 of first node 502 and/or that may include a message received via network 506 by execution environment 401 of first node 502. Attach data flow 708 illustrates a data flow to mount service component 408 operating in execution environment 401 of first node 502. Mount service component 408 may be invoked automatically in response to detecting a mount descriptor in an aspect. In another aspect, mount service component 408 may be invoked in response to a user input. A representation of a data object identified in a mount descriptor may be created automatically in response to detecting the mount descriptor and/or detecting a user input associated with the message in which the mount descriptor was received.

Once a location is identified, in a data store of an execution environment, for attaching and/or otherwise mounting a representation of a data object in a data store in another execution environment; any of a variety means available to the execution environment mounting the data object may be utilized.

FIG. 8A illustrates a mount descriptor identifying alternative URLs for accessing the "Music" folder in the data store in execution environment 401 of second node 504. A Samba URL 808a identifies a protocol and a location for accessing the "Music" folder. Mount service component 408 in execution environment 401 of first node 502 may interoperate with a Samba client (not shown) included in and/or associated with file system 427, which in an aspect may be and/or may be included in the data store of execution environment 401 of first node 502. Samba URL 808a may include user identification and authentication information to the Samba client if needed. Alternatively, the Samba client and/or mount service 408 may receive such information from the user and/or from a pre-stored profile. In an aspect, the "Music" folder may be mounted, as a drive, in execution environment 401 of first node 502.

In another aspect, a mount descriptor may identify a representation of a data object that is to be removed and/or otherwise unmounted. A first execution environment may detect a mount descriptor that identifies data object in a data store in a second execution environment. It may be determined that the data object is represented at a location in data store of the first execution environment. The representation may be removed based on the mount descriptor.

In yet another aspect, a mount descriptor may identify a printer accessible to second execution environment. A first execution environment may create a representation of the printer, accessible in the first execution environment, based on the mount descriptor. Accessing the representation of the printer may include accessing the printer via the network. The printer may be accessed directly and/or indirectly, for example via the second execution environment. Samba as well as other services allows access to printers. Thus, a mount descriptor may identify a printer in and/or accessible to execution environment 401 of second node 504 to mount in execution environment 401 of first node 502.

As an alternative and/or in case execution environment 401 of first node 502 does not include a Samba client and/or a compatible analog, a mount descriptor may specify one or more alternatives in addition to or instead Samba. For example, execution environments may be separated and/or otherwise blocked by one or more firewalls, Mount Service 408 may operate to mount the "Music" found via another identifier in mount descriptor 804a. Web Distributed Authoring and Versioning (WebDAV) is an extension of the Hypertext Transfer Protocol (HTTP) that facilitates collaboration between users in editing and managing documents and files stored on World Wide Web servers. A WebDAV URL 810a identifies HTTP as an access protocol and identifies a location in execution environment 401 of second node 504 for accessing the "Music" folder. Mount service component 408 in execution environment 401 of first node 502 may interoperate with a WebDAV client (not shown) included in and/or associated with file system 427, which in an aspect may be and/or may be included in the data store of execution environment 401 of first node 502. WebDAV URL 810a may include user identification and authentication information to the WebDAV client if needed. Alternatively, the WebDAV client and/or mount service 408 may receive such information from the user and/or from a pre-stored profile. In an aspect, the "Music" folder may be mounted as a folder in, for example, a pre-existing Music folder in execution environment 401 of first node 502. The two music folders may be presented as a merged entity. In another aspect, the "Music" folder identified in the mount descriptor may be mounted at a location in the pre-existing Music folder. The mounted folder may be renamed to distinguish it from a folder with the same name and/or to identify its source by user and/or by node, for example. Alternatives to WebDAV include the file transfer protocol FTP.

In yet another aspect, a representation of a data object a may include and/or may otherwise be based on a replica of at least a portion of the data object. The replica may be synchronized with other replicas and/or an original data object. A mount service 408 may interoperate with an XtreeemFS client to create a representation of a data object identified in a mount descriptor at location in a data store. XtreemFS replicates file data across multiple storage servers, which can be distributed worldwide. The replication algorithm is designed to handle problems and failure scenarios that can occur in distributed systems including message loss, network partitions, server crashes, and the like. When a replicated file is opened, XtreemFS automatically elects a primary replica for that file which processes all file operations. If the primary fails, one of the backup replicas will automatically take over after a short failover period. To an application accessing a file via XtreemFS a regular file and/or folder and a replicated representation behave the same or similarly.

For read-only access, replicas of an original folder and/or file may be created and distributed to various replication servers to enhance performance. Through replication a caching infrastructure may be built in order to reduce latency and bandwidth consumption. Partial replicas may be supported, in addition to or instead of full replicas. File, folder, and/or other data object metadata may also be replicated.

Thus, as described above, a representation of a remote data object may be created based on a mount descriptor that includes information for accessing the data object based on at least one of Samba, content management interoperability services (CMIS), Web Distributed Authoring and Versioning (WedDAV), Atom Publishing Protocol (AtomPub), file transfer protocol (FTP), RSS, SSH FTP, and an identified network file system.

Other distributed file systems that may be accessed to mount a. representation of a data object identified in a mount descriptor at a location in a data store. The Andrew File System (AFS), the Distributed File System (DFS), and the Network File System (NFS). Atom Publishing Protocol (AtomPub), file transfer protocol (FTP), RSS, SSH FTP, and content management interoperability services (CMIS) are other means for mounting a data object identified in a mount descriptor.

With reference to FIG. 2B, a block 212 illustrates that the method includes receiving, by a second communications agent that represents a second user, data object information that identifies a data object in a second data store in a second execution environment that includes the second communications agent. Accordingly, a system for sharing a data object in a data store via a communication includes means for receiving, by a second communications agent that represents a second user, data object information that identifies a data object in a second data store in a second execution environment that includes the second communications agent. For example, the arrangement in FIG. 3B, includes descriptor handler component 304 that is operable for receiving, by a second communications agent that represents a second user, data object information that identifies a data object in a second data store in a second execution environment that includes the second communications agent. FIG. 4 illustrates descriptor handler component 404 as an adaptation and/or analog of descriptor handler component 304 in FIG. 3B. One or more descriptor handler components 404 operate in an execution environment 401. The system for sharing a data object in a data store via a communication includes one or more processors and logic encoded in one or more tangible media for execution by the one or more processors that when executed is operable for receiving, by a second communications agent that represents a second user, data object information that identifies a data object in a second data store in a second execution environment that includes the second communications agent. In FIG. 4, a descriptor handler component 404 is illustrated as a component of communications agent 403.

FIG. 7 includes data flow message that illustrates a create mount descriptor (createMD) data flow 710 data flow to create and/or otherwise construct a mount descriptor that identifies a data object in a data store of execution environment 401 of second node 504. Create mount descriptor data flow 710 in FIG. 7 may, in FIG. 4, represent providing and/or otherwise identifying access information to descriptor handler component 404 to process in creating a mount descriptor for a data object identified by the data object information. Create mount descriptor data flow 710 may be internal to execution environment 401 of second node 504 and/or may include interoperation by execution environment 401 of second node 504 via a network with another node.

Figure 6D:
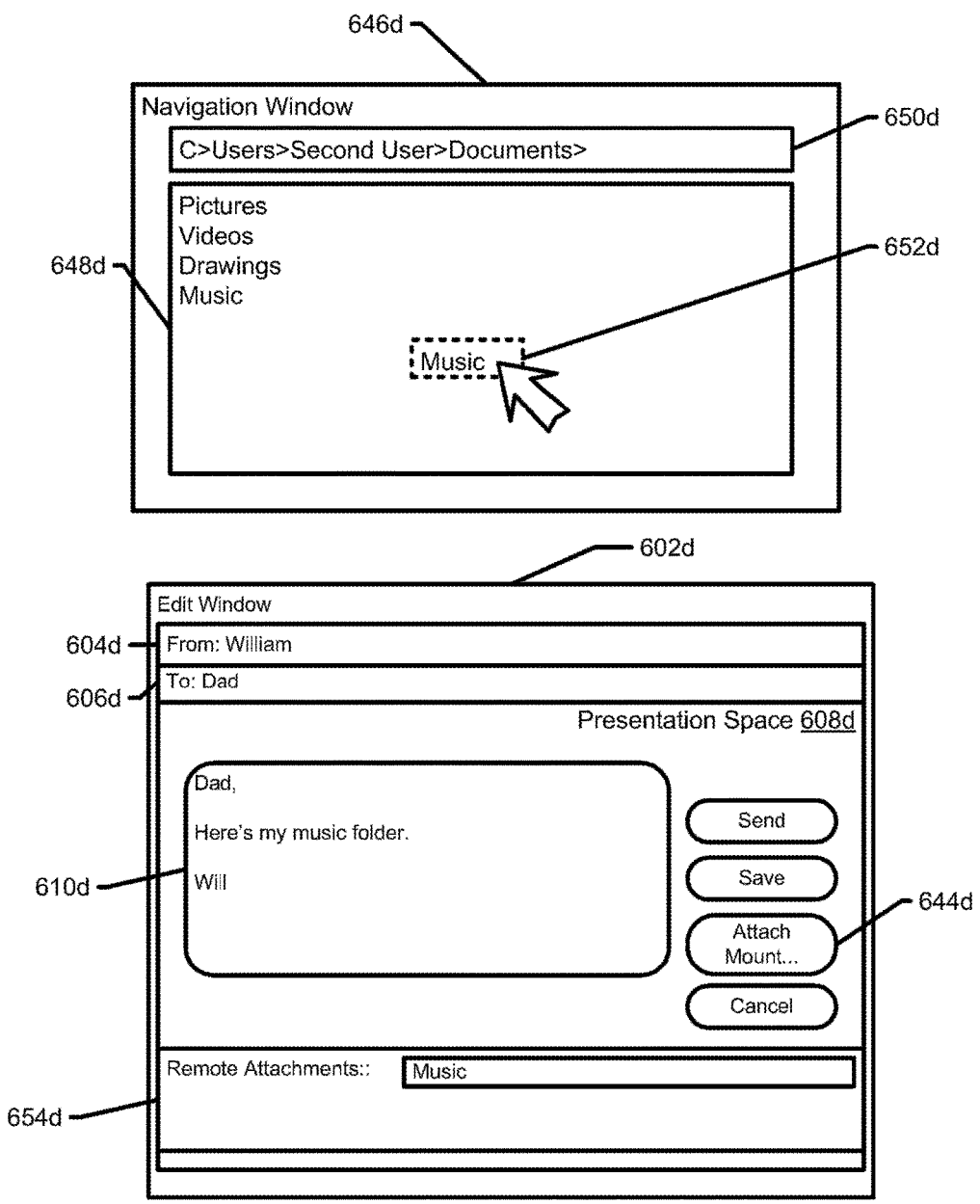
FIG. 6D is a diagram illustrating a user interface presented via a display according to another aspect of the subject matter described herein.

FIG. 6D, illustrates an edit window UI element 602d that, in an aspect, may be presented by communication agent 403 in execution environment 401 of second node 504 in response to a user input to create a new email. In an aspect, a user of communications agent 403 operating in execution environment 401 of second node 504 may provide input corresponding to attach mount UI element 644d in edit window UI element 602d. A corresponding UI element handler component 415 may operate to invoke data store navigator component 406 to present a navigation window UI element 646d to locate one or more data objects in response to user interaction. Data store navigation component 406 may interoperate with one or more UI element handlers 415, directly or indirectly via descriptor handler component 404, in an aspect, to present the navigation window UI element 646d and its contents.

Navigation window UI element 646d is presented to receive data object information in response to user input to identify a data object in a data store of execution environment 401 of second node 504. A folder content pane UI element 648d in navigation window UI element 646d is presented including representations of one or more data objects at a location, identified in a path UI element 650d. A pointer UI element 652d illustrates a drag and drop operation of a "Music" folder represented in contents pane UI element 648d, dropped on edit window UI element 602d. In response, to detecting the drag and drop operation by one or more UI element handler components 415, data store navigator component 406 may interoperate with the one or more UI element handle components 415 to provide data object information identifying the data object to descriptor handler component 404.

Returning to FIG. 2B, a block 214 illustrates that the method further includes creating a mount descriptor for accessing the data object from the second data store by a first data store in a first execution environment including a first communications agent that represents a first user. Accordingly, a system for sharing a data object in a data store via a communication includes means for creating a mount descriptor for accessing the data object from the second data store by a first data store in a first execution environment including a first communications agent that represents a first user. For example, the arrangement in FIG. 3B, includes descriptor generator component 314 that is operable for creating a mount descriptor for accessing the data object from the second data store by a first data store in a first execution environment including a first communications agent that represents a first user. FIG. 4 illustrates descriptor generator component 414 as an adaptation and/or analog of descriptor generator component 314 in FIG. 3B. One or more descriptor generator components 414 operate in an execution environment 401. The system for sharing a data object in a data store via a communication includes one or more processors and logic encoded in one or more tangible media for execution by the one or more processors that when executed is operable for creating a mount descriptor for accessing the data object from the second data store by a first data store in a first execution environment including a first communications agent that represents a first user. In FIG. 4, descriptor generator component 414 is illustrated as a component of communications agent 403.

As described above, FIG. 7 illustrates a create mount descriptor (createMD) data flow 710. Create mount descriptor data flow 710 may result from a request from a remote node, described below, and/or may result in access information received in response to user input, also described above. Access information received by descriptor handler component 404 may be provided to and otherwise identified to a descriptor generator component 414 which may also be included in create mount descriptor data flow 710. Descriptor generator component 414 operates to create and/or otherwise construct a mount descriptor.

Data objects located and/or otherwise identified by data object information received by descriptor handler component 404 may be identified to descriptor generator component 414 to construct and/or otherwise create a mount descriptor identifying the data objects. A descriptor handler component may be a type of content handler component that operates to process data object information to create a mount descriptor that conforms to a schema for creating and/or otherwise constructing a valid mount descriptor. The descriptor generator component 414 may construct and/or otherwise create a mount descriptor based on a schema that defines and/or otherwise identifies a valid mount descriptor for a particular type of communication supported by a communications agent. The mount descriptor is constructed and/or otherwise created, based on the data object information, by the descriptor generator component 414.

Descriptor generator component 414 in execution environment 401 of second node 504 may provide the mount descriptor to content manager component 402 to include and/or otherwise identify the mount descriptor in a communication with execution environment 401 of first node 502, such as an email and/or instant message. Content manager component 402 may interoperate with other types of content handler components 413 to create and/or otherwise construct a message that includes the valid mount descriptor.

A mount descriptor may be included in a message according to a protocol schema that identifies the message as valid according to a communications protocol. In an aspect, the descriptor generator component 414 may interoperate with the content manager component 402 to create a valid mount descriptor according to a specified schema for the message, so that the message is valid according to a communications protocol supported by a communications protocol component 407 that operates to send the message. As described above, the content manager component 402 may operate in execution environment 401 of second node 504 along with a descriptor generator component 414 to transform data object information into a mount descriptor to include along with data for other parts of a communication into one or more representations suitable for transmitting in a communication, such as a message, to another node, such as first node 502. Some or all of the representations transmitted are suitable for processing by the communications agent in execution environment 401 of first node 502. The content manager component 402 in the execution environment 401 of second node 504 may package the one or more data representations including a representation of the mount descriptor into a message formatted according to the communications protocol.

A descriptor generator component 414 and/or a content manager component 402 may operate to construct a mount descriptor in a communication. A content type identifier may be included in a position and/or location that identifies a mount descriptor in a communication. The position or location may be absolute or relative. For example, a schema for a communication may define that a mount descriptor in a communication is included in the communication at the end of the communication. There may be one or more mount descriptors at the end. In another aspect, a schema for a communication may specify that a portion of a communication following a particular type of message portion is a mount descriptor. Other mount descriptors may follow. If no mount descriptor is included, the mount descriptor portion may include no content or may include an indicator that no mount descriptor is included.

FIG. 8A includes an exemplary content portion 800a of an email message. Content portion 800a includes a user message portion 802a and a mount descriptor portion 804a described in more detail above. FIG. 8A illustrates an "application/mount-descriptor" MIME type identifier that may be defined to identify a schema for content including one or more mount descriptors. FIG. 8A illustrates a mount descriptor 804a including two identifiers for the "Music" folder. A first identifier 808a illustrates a Samba URL for accessing the "Music" folder via a Samba file sharing system. The second identifier 810a illustrates a WebDAV HTTP URL that may allow a receiving node to access the identified data object via a WebDAV server operating in and/or available to an execution environment sending the mount descriptor 804a. An FTP URL 812a illustrates a file transfer protocol (FTP) that may allow a receiving node to access the identified data object via a FTP server operating in and/or available to an execution environment sending the mount descriptor 804a Other means are described about with respect to operation of the method illustrated in FIG. 2A. All such means are suitable for performing the method illustrated in FIG. 2B.

Returning to FIG. 2B, a block 216 illustrates that the method yet further includes including, by the second communications agent, the mount descriptor in a first message, addressed to the first user. Accordingly, a system for sharing a data object in a data store via a communication includes means for including, by the second communications agent, the mount descriptor in a first message, addressed to the first user. For example, the arrangement in FIG. 3B, includes content manager component 302 that is operable for including, by the second communications agent, the mount descriptor in a first message, addressed to the first user. FIG. 4 illustrates content manager component 402 as an adaptation and/or analog of content manager component 302 in FIG. 3B. One or more content manager components 402 operate in an execution environment 401. The system for content manager includes one or more processors and logic encoded in one or more tangible media for execution bye the one or more processors that when executed is operable for including, by the second communications agent, the mount descriptor in a first message, addressed to the first user. In FIG. 4, a content manager component 402 is illustrated as a component of application 403.

As described above, FIG. 7 illustrates first message 702, including a mount descriptor, sent via network 506 by execution environment 401 of second node 504 to execution environment 401 of first node 502. In an aspect described below, first message 702 may be sent in response to previous message 708.

A mount descriptor generated by a descriptor generator component 414, along with a user message and any other data to include in a communication, may be provided and/or otherwise identified to content manager component 402 for sending in the communication. The content manager component 402 in execution environment 401 of second node 504 may package data from descriptor generator component 414 including a representation of the mount descriptor into the message formatted according to the communications protocol.

Returning to FIG. 2B, a block 218 illustrates that the method yet further includes sending, via a communications protocol via the network by the second communications agent, the first message for delivery to the first communications agent to create, based on the mount descriptor, a representation, of the data object in the first data storage, that when accessed includes accessing the data object from the second data store. Accordingly, a system for sharing a data object in a data store via a communication includes means for sending, via a communications protocol via the network by the second communications agent, the first message for delivery to the first communications agent to create, based on the mount descriptor, a representation, of the data object in the first data storage, that when accessed includes accessing the data object from the second data store. For example, the arrangement in FIG. 3B, includes com-out component 318 that is operable for sending, via a communications protocol via the network by the second communications agent, the first message for delivery to the first communications agent to create, based on the mount descriptor, a representation, of the data object in the first data storage, that when accessed includes accessing the data object from the second data store. FIG. 4 illustrates com-out component 418 as an adaptation and/or analog of com-out component 318 in FIG. 3B. One or more com-out components 418 operate in an execution environment 401. The system for sharing a data object in a data store via a communication includes one or more processors and logic encoded in one or more tangible media for execution by the one or more processors that when executed is operable for sending, via a communications protocol via the network by the second communications agent, the first message for delivery to the first communications agent to create, based on the mount descriptor, a representation, of the data object in the first data storage, that when accessed includes accessing the data object from the second data store. In FIG. 4, a com-out component 418 is illustrated as a component of application 403.

Com-out component 418 may provide the mount descriptor, the user message, and any other data for sending in the communication in representations suitable for sending by communications protocol component 407 to the communications agent in execution environment 401 of first node 502. Communications protocol component 407 operating in execution environment 401 of second node 504 may send the data as and/or in a communication, such as an email message, according to the specification(s) of the communications protocol. Communications protocol component 407 may further package and/or otherwise transform the data to send via network stack 405 for delivery via network 506 to execution environment 401 of first node 502.

Content manager component 402 may alternatively or additionally encode and/or otherwise transform one or more of the data representations for sending in a data stream such as voice stream and/or a video stream for communicating in a communication with the communications agent in execution environment 401 of first node 502

The methods illustrated in FIG. 2A-B may include additional aspects supported by various adaptations and/or analogs of the arrangement of components in FIG. 3A-B.

In an aspect, a mount descriptor may be received as a response to a data object request in a message previously sent. A data object request may include some or all of a keyword expression, a regular expression, an XQuery expression, an XPath expression, a file system path expression, and a structured query language statement.

The previously sent message may include the data object request in the message separate from a user readable message. The user readable message may be detected by a receiving execution environment along with the data object request. The data object request may be included in the previously sent message according to a schema that identifies the message as valid according a communications protocol by which the message was sent in the communication.

The data object request may include match information identifying a matching criterion for locating and/or otherwise identifying a data object to be mounted. With respect to FIG. 4 and FIG. 5, execution environment 401 of first node 502 may request a mount descriptor from execution environment 401 of second node 504. FIG. 7 includes a data flow message that illustrates a match information data flow 712 that may occur at least partially in execution environment 401 of first node 502 and/or may include a message (not shown) received via network 506 by execution environment 401 of first node 502. Match information data flow 712 may represent, in FIG. 4, a data flow to an identify mount constructor (IMC) component 410 operating in execution environment 401 of first node 502. The data flow may be via descriptor handler component 404.

Sending a message including a data object request may include receiving, by a first execution environment, matching information, identifying a data object matching criterion, from a first user. The message, including a data object request based on the data object matching criterion, may be sent, via the network, to a second execution environment. The message is addressed to the second user. The data object request may be included in the message according to a schema that identifies the previous message as valid according a communications protocol in the communication. A mount descriptor may be received in a subsequent message, in response to sending the data object request.

In various aspects, IMC component 410 may receive matching information from a user via one or more UI element handler components 415. The matching information may be received, in response to a user input detected by an input device of an execution environment 401 that includes the IMC component 410. Alternatively or additionally, matching information may be received by an IMC component in a message received via a network. For example, a user may identify matching information to a browser operating in a client node. The browser may send the matching information via a network communicatively coupling the client node to a web service provider node. The web service provider node may include an IMC component that may operate to receive the matching information identified in the message from the browser. In another aspect, an IMC component may be provided in whole or in part by execution environment 401 of node 502 to a browser in another execution environment.

Figure 6E:
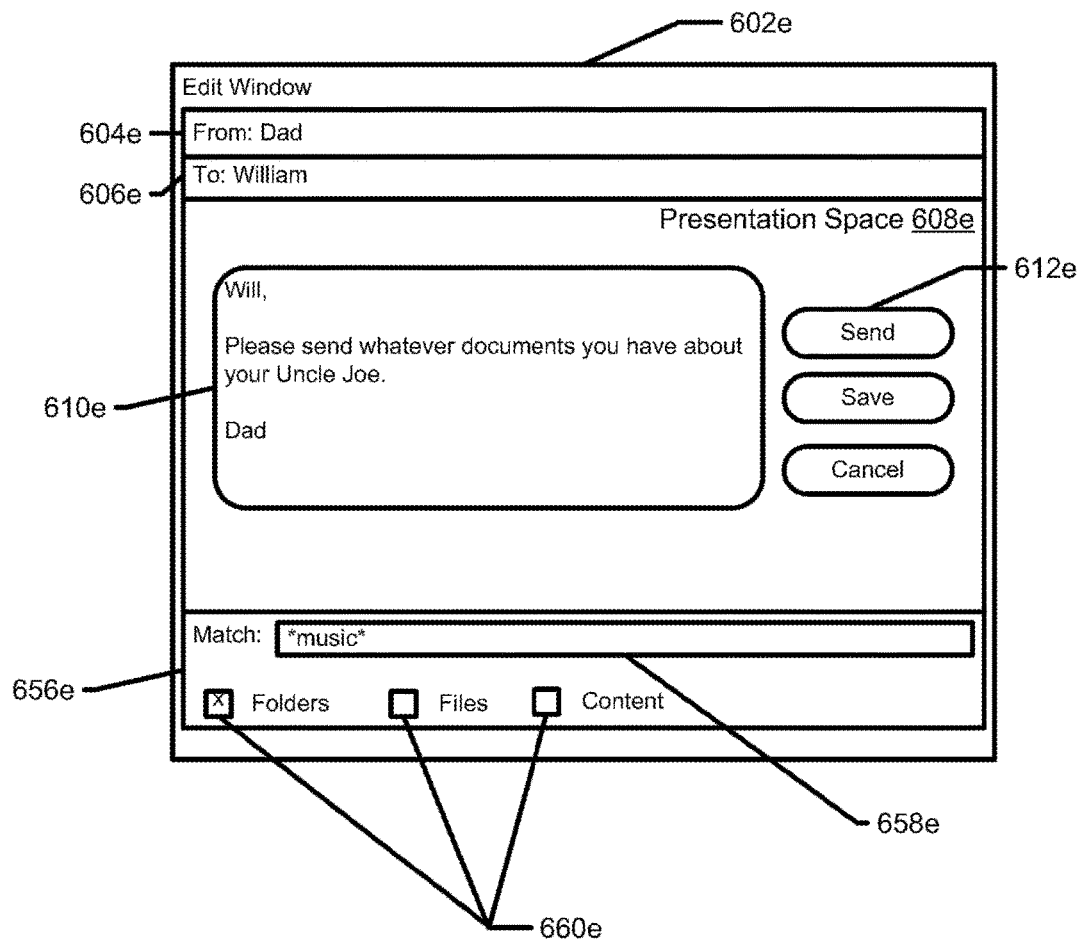
FIG. 6E is a diagram illustrating a user interface presented via a display according to another aspect of the subject matter described herein.

FIG. 6E illustrates an exemplary user interface that may be presented by communications agent 403 operating in execution environment 401 of first node 502. A UI element handler component 415 may operate to present a user interface element to allow a user to identify matching information. A matching information (MI) UI element 656e is illustrated in FIG. 6E as an example. The same or different UI element handler component 415 may present various other UI elements included in MI UI element 656e. MI UI element 656e and one or more UI elements it includes may be presented by one or more corresponding UI element handler component(s) 415 that may operate based on a schema that defines valid matching information and/or data object requests for including in a communication via a communications agent 403. The schema defines one or more rules and/or a vocabulary that defines whether matching information and/or a data object request is valid. Those skilled in the art will understand that numerous languages and/or schemas for providing matching information and/or data object requests currently exist including relatively simple key word based queries to relatively more complicated regular expression languages and data base query languages, such as various versions of structured query language (SQL). New schemas are and will be created, and are, thus, considered within the scope of the subject matter described herein.

MI NI UI element 656e illustrates a user interface for a keyword based schema. Match textbox UI element 658e illustrates a textbox allowing a user to enter a keyword expression. Various checkbox UI elements 660e allow a user to define a scope of a data object request by identifying whether a resulting data object request is to be applied to folders, files, and/or content of files in a data store. A communications agent 403 may support more than one data object request schema and/or corresponding matching information schema. A communications agent may provide a user interface to receive valid matching information for each respective schema.

FIG. 7 includes data flow message that illustrates a create data object request (CIReq) data flow 714 that may be internal to execution environment 401 of first node 502 and/or may include a message received via network 506 by first node 502. With respect to FIG. 4, CIReq data flow 714 may illustrate a data flow to an IMC component 410 operating in execution environment 401 of first node 502. Match information may be identified to and/or otherwise provided to IMC component 410.

An IMC component 414 may be a type of content handler component and/or may be included in a content handler component that operates to process match information to create a data object request that conforms to a schema for creating and/or otherwise constructing a valid data object request. IMC component 410 may construct and/or otherwise create a data object request based on a schema that defines and/or otherwise identifies a valid data object request and/or a valid mount descriptor for a particular type of communication supported by a communications agent. The data object request descriptor is constructed and/or otherwise created, based on the match information, by IMC component 410. IMC component 410 in execution environment 401 of first node 502 may provide the data object request to content manager component 402 to include and/or otherwise identify the data object request in a communication with execution environment 401 of second node 504, such as email and/or instant message. Content manager component 402 may interoperate with other types of content handler components 413 to create and/or otherwise construct a message that includes the valid data object request.

In an aspect, IMC component 410 may interoperate with the content manager component 402 to create the valid data object request according to a specified schema for the message, so that the message is valid according to a communications protocol supported by a communications protocol component 407 that operates to send the message. As described above, the content manager component 402 may operate in execution environment 401 of first node 502 along with IMC component 410 to transform match information into a data object request to include along with data for other parts of a communication into one or more representations suitable for transmitting in a communication, such as a message, to another node, such as second node 504. Some or all of the representations transmitted are suitable for processing by the communications agent in execution environment 401 of second node 504. The content manager component 402 in the execution environment 401 of first node 502 may package the one or more data representations including a representation of the data object request into a message formatted according to the communications protocol.

In FIG. 8B, a portion of an email communication 800b is illustrated formatted as a multipart/mixed content type including data object request portion 802b. A data object request portion of a communication may be identified as a data object request by its location in the communication and/or by an identifier or markup element, such as a MIME type identifier. A data object request may be detected based on content included in the message and/or based on metadata such as content-type header 804b identifying a MIME type identifier, such as "application/id-request", which may be defined for representing one or more matching criteria in a data object request. The "application/id-request" MIME type identifier is exemplary. Other MIME type identifiers exist and/or may be defined to identify a data object request in a communication.

An IMC component and/or a content manager component may operate to construct a data object request in a communication based on XQuery, regular expression, and/or SQL content, to name a few examples. A content type identifier may be included in a position and/or location that identifies a data object request in a communication. The position or location may be absolute or relative. For example, a schema for a communication may define that a data object request in a communication is included in the communication at the end of the communication. There may be one or more data object requests at the end. In another aspect, a schema for a communication may specify that a portion of a communication following a particular type of message portion is a data object request. Other data object requests may follow. If no data object request is included, the data object request portion may include no content or may include an indicator that no data object request is included.

FIG. 8B illustrates an "application/id-request" MIME type identifier that may be defined to identify a schema for an XML-based language for specifying id-request XML documents. FIG. 8B illustrates id-request document 806b. Id-request document 806b, as illustrated, includes criterion tag elements 808b corresponding to the form elements in a user interface FIG. 6A. A criterion tag element 808b identifies a matching criterion name, such as "query" indicating that the criterion is a query expression or a portion thereof. A "type" attribute identifies a schema with the identifier "keyword" for the expression. The criterion tag element 808b identifies a value for a query "*music*" in a match-expression attribute. Another criterion tag element 808b specifies a scope query specified in the first criterion tag element. FIG. 8B illustrates an "and" tag 810b indicating that all the matching criteria must be met for identifying a data object. An "or" tag (not shown) may be defined by a schema for id-request documents. Other operator elements and operator precedence may be defined by the schema. Grouping elements for managing operator precedence, such as parenthesis element, may be defined by the schema.

FIG. 7 includes a data flow that illustrates a previous message 716 (with respect to first message 702) including a data object request. Previous message 716, as shown, may be sent via network 506 by execution environment 401 of first node 502 to execution environment 401 of second node 504. In an aspect, first message 702 may be sent in response to previous message 716.

In various aspects, a data object request may be based on a date, a time, a length of time, a file type, a database record key, content of the data object, a content type identifier, a format rule, a vocabulary, a role of a user, a security attribute, a location in a data store such as a file system, an attribute of an identified data object, a size, a task, a transaction, a state, a user, a group, a requester, a relationship including a requesting user and a responding user, a keyword, a tag, a folder, and/or a path portion of a data object identifier, to name a few examples.

A descriptor handler component in an execution environment may receive data object information in response to a request from a communications agent in another execution environment. As described above, FIG. 7 illustrates previous message 716, including a data object request, received via network 506 by execution environment 401 of second node 504 from execution environment 401 of first node 502.

In addition to packaging representations of data in a structure and/or format for sending a message according to a communications protocol, a content manager component 402 may operate to detect a data object request received and/or otherwise identified in a message received in a communication. Content manager component 402 operating in execution environment 401 of second node 504 may receive the message, illustrated by previous message 716, in a communication with execution environment 401 of first node 502. Com-in component 411 in execution environment 401 of second node 504 may receive the message via communication protocol component 407 and network stack 405. Previous message 716 may be delivered to execution environment 401 of second node 504 via network 506 based on a communications address of a communicant represented by communications agent 403 in execution environment 401 of second node 504. A communications agent may represent more than one communicant identified by different addresses.

Previous message 716 in FIG. 7 may be received in one or more packets via network 506 by network stack 405 and communications protocol component 407 in an instance of and/or analog of execution environment 401 including and/or otherwise provided by second node 504. The data in the communication may be received by com-in component 411. Com-in component 411 may provide the data to content manager component 402. Content manager component 402 may determine one or more content types of the data. The content and/or portions of the content may be provided to one or more content type handler components 413 based on the one or more content types identified by content manager component 402. For example, FIG. 8B illustrates message portion 812b including "text/plain" MIME type identifier 814b as a content type identifier. Message portion 812b may be provided to a text/plain content handler 413. Audio data in a voice communication may be provided to an audio content handler component 413, and video data in a video communication may be provided to a video content handler component 413.

FIG. 7 includes a data flow message that illustrates a detect data object request (detectOReq) data flow 718 that may be internal to execution environment 401 of second node 504 and/or may include interoperation with another node via a network. With respect to FIG. 4, detect data object request data flow 718 may correspond to a data exchange and/or other interoperation between content handler component 402 and descriptor handler component 404 to detect and/or otherwise process the data object request received in previous message 716 by execution environment 401 of first node 502. FIG. 7 further includes a data flow message that illustrates a locate message 720, that may be included in an aspect of the method illustrated in FIG. 2B, for locating one or more data objects based on the data object request. The data object request may include and/or otherwise identify a matching criterion. The matching criterion may be identified based on match information identified by the communicant represented by execution environment 401 of first node 502. The one or more data objects may be located and/or otherwise identified by determining a data object or data objects that match the matching criterion. The data object(s) may be in a data store in and/or otherwise accessible to execution environment 401 of second node 504, such as one or more files in a file system of execution environment 401 of second node 504. Locate message 720 may be internal to execution environment 401 of second node 504 and/or may include a message exchanged with a remote device, such as database server and/or a network attached storage device providing storage locations for some or all of a file system of execution environment 401 of second node 504.

Com-in component 411 in execution environment 401 of second node 504, as described above, provides the previous message 716, received from execution environment 401 of first node 502, to content manager component 402. Content manager component 402 is operatively coupled, via com-in component 411, to communications protocol component 407 for receiving data in communications with other nodes, such as execution environment 401 of first node 502. Thus, execution environment 401 of second node 504 may receive a message via a com-in component 411 in a communication with execution environment 401 of first node 502. The message may include a data object request based on match information identified by a user to communications agent 403 in execution environment 401 of first node 502.

Data received in a communication, such as in a message, may include data of various content types. In FIG. 4, communications agent 403 in execution environment 401 of second node 504 includes one or more content handler components 413 to process data received according to its content type. Content manager component 402 may detect and/or otherwise identify a portion of the message as the data object request sent from execution environment 401 of first node 502. The data object request may be identified by content manager component 402 according to a schema for the message and/or a schema for the data object request. For example, a portion of the message may include a MIME-type identifier that identifies the portion as a data object request and/or otherwise identifies the portion for routing to descriptor handler component 404 operating in and/or otherwise on behalf of execution environment 401 of second node 504. Alternatively or additionally, the data object request may have structure and/or content that is valid and identifiable according to a schema for defining and/or otherwise identifying valid data object requests. A descriptor handler component may be provided as a type of content handler component, in an aspect. Alternatively or additionally, a descriptor handler component may interoperate with one or more content handler components to detect a data object request in a message received by a content manager component.

As such, descriptor handler component 404 may operate along with other content handler components 413 to process data representations received in the message 716 from execution environment 401 of first node 502. Descriptor handler component 404 may also provide transformed data from the representations to one or more user interface element handler components 415. Descriptor handler component 404 operates to validate and process data object requests according to a schema defining valid data object requests. Various portions of a message including a data object request may be provided to one or more content handler components 413, including descriptor handler component 404, to interoperate with presentation controller component 417 in execution environment 401 of second node 504 to present some or all of the received message, including the data object request.

Figure 6F:
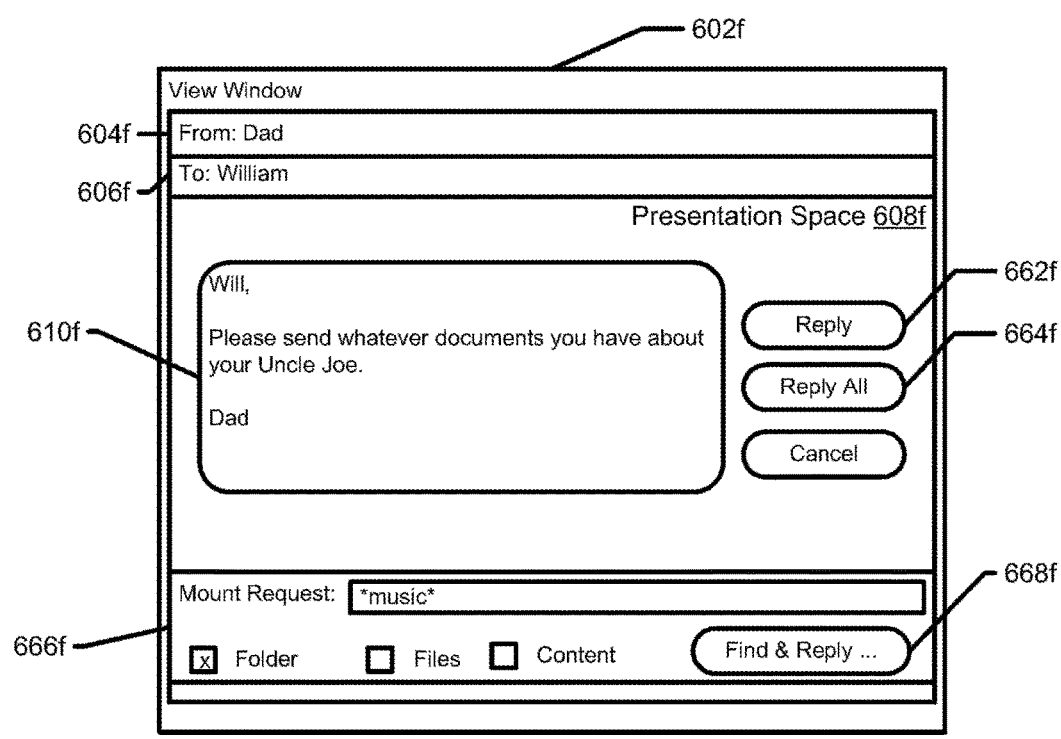
FIG. 6F is a diagram illustrating a user interface presented via a display according to another aspect of the subject matter described herein.

FIG. 6F illustrates a window, view window UI element 602f, presenting an exemplary representation of a message, such as previous message 716, received in a communication from execution environment 401 of first node 502 by second node 504. FIG. 6F, view window UI element 602f includes a contactor UI element 604f, a contactee UI element 606f, and a presentation space 608f of the view window UI element 602g that includes a user message UI element 610f including a text portion of the message provider by the communicant represented by execution environment 401 of first node 502. The various UI elements may be presented by one or more UI element handler components 415 in communications agent 403 operating in execution environment 401 of second node 504. A reply UI element 662f and a reply all UI element 664f are illustrated as exemplary UI elements in presentation space 608f presented to allow a user of execution environment 401 of second node 504 to respond and/or otherwise perform an operation based on the received message. FIG. 6F illustrates a data object request UI interface element 666f where the data object request identified in the message from execution environment 401 of first node 502 is represented to the communicant represented by the execution environment 401 of second node 504. In an aspect, the communicant is allowed to authorize the request by providing an input corresponding to a find and reply UI element 668f. In another aspect, the communicant may allowed to modify the data object request.

As described herein in an aspect, content manager component 402 may detect content type information to detect a data object request in a communication. For example, the message portion illustrated in FIG. 8B may be received in previous message 716. Content manager component 402 may detect "application/id-request" MIME type identifier in content-type header 804b. The "application/id-request" MIME type identifier may be defined to identify a data object request based on one or more matching criteria for identifying a requested data object. Content manager component 402 may identify data object request portion 802b as including the data object request.

In response to detecting a data object request in previous message 716, content manager component 402 may provide data some or all of the data object request to descriptor handler component 404. For example, descriptor handler component 404 may be configured to operate according to a schema defining a format and/or a vocabulary for an XML-based language for id-request documents. Content manager component 402 may provide id-request document 806b, as a data object request, to descriptor handler component 404. Descriptor handler component 404 may operate according to the id-request schema. In an aspect, descriptor handler component 404 may process more than one data object request content type. Alternatively or additionally, execution environment 401 may include multiple descriptor handler components 404 for supporting multiple data object request content types.

As described above, in an aspect, a user may be allowed to select which data objects, if any, are to be identified in a mount descriptor from one or more data objects located and/or otherwise identified by descriptor handler component 404 based on a received data object request. In another aspect, communications agent 403 in FIG. 4 may invoke descriptor handler component 404 automatically to locate one or more data objects based on a matching criterion identified in a data object request and in response to detecting a data object request in a communication, such previous message 716 in FIG. 7. In another aspect, communications agent 403 may invoke descriptor handler component 404 automatically to locate one or more data objects based on a data object request in a communication in response to detect an indication to present, via a output device, some or all of a user message received in a message in the communication. Descriptor handler component 404 may be invoked and/or may operate based on the data object request and/or matching criterion identified to locate a data object prior to, during, and/or after other content received in the communication is processed. Results of a locate operation may be received as data object information.

Figure 6G:
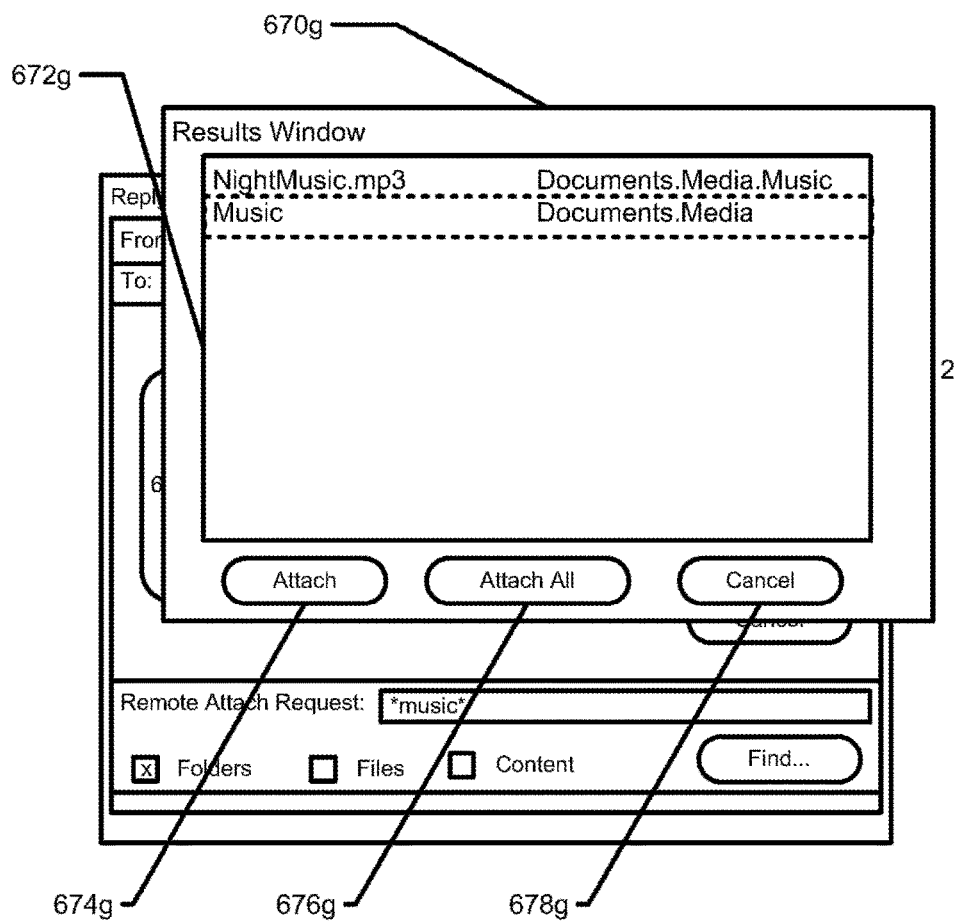
FIG. 6G is a diagram illustrating a user interface presented via a display according to another aspect of the subject matter described herein.

FIG. 6G illustrates a results window UI element 670g includes results pane UI element 672g including representations of two data objects located and/or otherwise identified by data store navigator component 406 based on the data object request. A user may select one or more data objects to identify in a mount descriptor. An attach UI element 674g may be presented, as illustrated, to allow a user to instruct communications agent 403 to identify one or more selected data objects in results pane UI element 672g in a mount descriptor. An attach all UI element 6774g is illustrated to allow for user input instructing communication agent 403 to identify all data objects represented in the UI element 670g in one or more mount descriptors in a communication with execution environment 401 of first node 502. A cancel UI element 678g allows a user to end presentation of results window UI element 670g. A user may opt to identify no data objects represented in the dialog UI element 670g and located and/or otherwise identified by data store navigator component 406 based on the data object request.

Data objects located and/or otherwise identified by data store navigator component 406 may be identified in data object information to descriptor generator component 414 to construct and/or otherwise create one or more mount descriptors identifying the data objects. As described above, a user may be allowed to select which data objects, if any, are to be identified in a mount descriptor from one or more data objects located and/or otherwise identified by data store navigator component 406. In another aspect, communications agent 403 in FIG. 4 may invoke data store navigator component 406 automatically to locate one or more data objects based on a matching criterion identified in a data object request and in response to detecting a data object request in a communication. In another aspect, communications agent 403 may invoke data store navigator component 406 automatically to locate one or more data objects based on a data object request in a communication in response to detecting an indication to present, via a output device, some or all of a user readable message received in a message in the communication. Data store navigator component 406 may be invoked and/or may operate based on the data object request and/or matching criterion identified to locate a data object prior to, during, and/or after other content received in the communication is processed.

In another aspect, a data object request UI element may be presented to receive one or more additional matching criteria from a user. Based on the data object request UI element and input from the user, descriptor handler component 404 may receive one or more additional matching criterion information and/or may receive input to modify a matching criterion identified in a received data object request. Descriptor handler component 404 may locate one or more data objects in response to receiving the additional criterion.

In another aspect, a data object located and/or otherwise identified by data object information in response to receiving a data object request must match a query identified by the data object request. Alternatively or additionally, a data object request may include an instruction and/or input for generating a data object, and locating the data object may include generating the data object. Generating a data object may include creating the data object and/or may include modifying and/or otherwise transforming an existing data object. For example, execution environment 401 of second node 504 may include a template stored in a file system. A data object request may identify the template. A descriptor handler component 404 may operate to identify a document or other data object that may be created, is being created, and/or has been created based on the template. In response to a data object request, execution environment 401 of second node 504 may return a mount descriptor that identifies the created and/or modified data object.

As described above, in various aspects, a data object request may be detected and/or represented based on various syntaxes, grammars, vocabularies, and/or languages. For example, a data object request may be identified and/or represented according to a file system search syntax, a regular expression language, a structured query language (SQL) query, a universal data object identifier schema, an XPATH based language, an XQuery based language, an XML based language, an HTML based language (form-based), and/or a keyword-value pair based language.

A data object request and/or a mount descriptor in a communication may be communicated via a network according to a first communications protocol. A user message may be exchanged between communicants in the communication via a second communications protocol. For example, a data object request and/or a mount descriptor may be sent on behalf of a first communicant by execution environment of a first node including a communications agent representing the first communicant. The data object request and/or the mount descriptor may be included in a communication along with a user readable message sent to the execution environment of a second node. The communicants represented by the execution environment of the first node and the execution environment of the second node may communicate via one or more exchanges of audio exchanged via a voice over IP (VoIP) communications protocol.

Exemplary data objects that may be requested via a data object request include a file, a program component, a data base record, video data, audio data, markup language, binary data, text data, an output of a service. Requested data objects may be pre-existing, volatile, and/or generated in response to the request.

As described above, receiving match information may include receiving a message, identifying the match information, via network from a node that received match information from the user. For example, match information may be received from a browser by a web server.

Match information and/or a data object request may be generated, detected, and/or otherwise processed according to a schema that identifies at least one of a rule and a vocabulary that defines a valid data object request. Similarly, a mount descriptor may be generated, detected, and/or otherwise processed according to a schema. One or more schemas may alone or together define one or more of valid data object information, match information, a data object request, and/or a mount descriptor. A schema, as just described, may be identified based on a data received and/or otherwise identified by an execution environment hosting a communications agent via the network from another execution environment hosting communications agent and/or from a path node included in a network path in the network communicatively coupling the node to one or more nodes that respectively host a communications agent.

In a further aspect, multiple alternative schemas may be defined for each of data object information, match information, data object requests, and/or mount descriptors. A schema may be selected and/or otherwise identified from the multiple schemas based by execution environment 401 of first node 502 and the execution environment 401 of second node 504 and/or based on information exchanged by the two nodes. For example, a schema may be selected by the first communicant and/or the second communicant. One may inform the other, via a communications protocol and/or via any other suitable means. The communicants may negotiate which schema to use via any suitable means.

The communications agents in execution environment 401 of second node 504 and execution environment 401 of first node 502 may select a schema For example, a schema may be identified and/or otherwise selected based on a communications protocol supported and/or a communications protocol not supported by one or both nodes. That is, in a negotiation to select communication protocol to use allowing communicants to exchange information, a schema may be identified. A schema may be identified and/or otherwise selected based on an attribute of the data object. A schema for identifying image data may be different than a schema for editable documents. A schema for identifying a data object in a first file system may be different than a schema for identifying a data object in a different data store.

As described above. In an aspect match information and/or a data object request, data object information, and/or a mount descriptor may identify a scope that specifies all or some portion of one or more data stores for locating, identifying, and/or otherwise accessing a data object. For example, a communication agent 403 in execution environment 401 of first node 502 may receive user input that identifies a folder in a file system of the execution environment 401 of second node 504 that defines a scope for locating a data object.

Match information and/or a data object request may be represented in a representation that includes a complete or a portion of at least one of a keyword expression, a regular expression, an XQuery expression, an XPath expression, a file system path expression, and a structured query language statement.

Further as also described above, a data object request and/or a mount descriptor may be included in a message according to a schema that identifies the message as valid for a specified communications protocol. Those skilled in the art are aware that schemas for email differ from schemas for instant messages and from streamed audio, for example.

A data object request and/or a mount descriptor may be exchanged in a communication in which audio data and/or image data is also exchanged. Multimedia may be a packaged to include one or more data streams which may include text based data streams. A data object request and/or a mount descriptor may be included in an email, an instant message, a multi-media message, a short-message service message, and/or a data stream. The data stream may include audio data, image data, and/or text data.

A data object request and/or a mount descriptor may be included in and/or detected in a communication based on a location in the communication and/or based on a marker, such as an identifier in the communication that identifies a location for the data object request, the mount descriptor, an access request, and/or an access response. The location may be absolute, such as fixed number of bytes or fields from the start or end of a message. Alternatively or additionally, the location may be identified by a location relative to another detectable portion of the communication. FIGS. 8A-B illustrate the user of MIME type identifiers as markers that identify locations for one or more of a data object request and/or a mount descriptor in a communication.

A data object request and/or a mount descriptor or respective portions thereof may include at least a portion of a keyword expression, a regular expression, expression including a Boolean operator, an expression including a precedence information, and a structured query language statement.

With respect to the method illustrated in FIG. 2B, the method as described above may include locating and/or otherwise identifying a data object automatically in response to receiving a data object request that matches and/or otherwise identifies the data object. Further, a mount descriptor may be created and/or otherwise generated automatically, in response to locating and/or otherwise identifying the data object.

In an aspect, in response to receiving and/or otherwise detecting a data object request, a user interface may be presented based on the data object request to prompt a user to process the data object request in some manner, such as authorizing the request and/or modify the request by restricting its scope. In response to detecting user input targeting and/or otherwise corresponding to the presented user interface, one or more data object may be located and/or otherwise identified based on the data object request.

A user may change a received data object request. One or more data object may be located and/or otherwise identified based on the changed data object request.

In a further aspect, once one or more data objects are located and/or otherwise identified based on a data object request and/or otherwise by data object information, a user interface may be presented to allow a user to identify the one or more data objects. Information from a user may be received that selects one or more data objects to identify in a mount descriptor and/or to not identify in the mount descriptor. A user, in an aspect, may be allowed to identify a data object not located and/or otherwise identified by the user's node. The data object, based on the user input, is identified in the mount descriptor.

In light of the description provided above, a mount descriptor may be generated automatically in response to detecting a corresponding data object request by an execution environment 401 of first node. Further, the automatically generated mount descriptor may be sent to the node that sent the corresponding data object request, The methods illustrated in FIG. 2A-B may yet further include additional aspects supported by various adaptations and/or analogs of the arrangement of components in FIG. 3A-B. Performing the method illustrated in FIG. 2A and/or the method illustrated in FIG. 2B and/or any of its extension and/or in any of its aspects may include one or more of calling a function or method of an object, sending a message via a network; sending a message via an inter-process communication mechanism such as a pipe, a semaphore, a shared data area, and/or a queue; and/or receiving a request such as poll and responding to invoke, and sending an asynchronous message.

Output devices suitable for presenting a representation of a data object and/or a tag include a visual output device, an audio output device, and a tactile output device. One output device may present a data object and another output device may present a tag with which the data object is tagged.

Any action included in performing the method illustrated in FIG. 2A as well as any action included in in performing the method illustrated in FIG. 2B may include sending and/or receiving a message via a network. Further, a message, included in performing any of the subject matter described herein and/or any of its extensions in any of its aspects, may an asynchronous message without a corresponding request.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a tangible computer readable medium for use by or in connection with an instruction execution machine, system, apparatus, or device, such as a computer-based or processor-containing machine, system, apparatus, or device. As used here, a "tangible computer readable medium" may include one or more of any suitable media for storing the executable instructions of a computer program in one or more forms including an electronic, magnetic, optical, and electromagnetic form, such that the instruction execution machine, system, apparatus, or device may read (or fetch) the instructions from the tangible computer readable medium and execute the instructions for carrying out the described methods. A non-transitory computer readable storage medium is tangible. A non-exhaustive list of conventional exemplary tangible computer readable storage media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A system, comprising:
   a first node including at least one non-transitory memory in communication with at least one processor, the first node configured to:
   display, at the first node, a first user interface element, a second user interface element, and a third user interface element;
   receive, at the first node, information associated with at least one folder via the first user interface element;
   send, from the first node via at least one network, the information associated with the at least one folder;
   receive, at the first node, an object associated with at least one email address via the second user interface element;
   send, from the first node via the at least one network, the object associated with the at least one email address;
   receive, at the first node, an indication of a selection of the third user interface element; and
   send, from the first node via the at least one network, the indication of the selection of the third user interface element;
   said first node further configured to communicate with a second node that is configured to:
   after the information associated with the at least one folder, the object associated with the at least one email address, and the indication of the selection of the third user interface element is sent via the at least one network; receive, at the second node via the at least one network, at least one email message identifying the at least one folder and including a reference to the at least one folder, without including a file attachment with the at least one email message;
   after the information associated with the at least one folder, the object associated with the at least one email address, and the indication of the selection of the third user interface element is sent via the at least one network; create, utilizing code configured to be stored on a storage at the second node and further configured to cooperate with a file explorer interface, a representation of the at least one folder in a location among one or more folders on the file explorer interface, where the storage of the second node does not store any file in the at least one folder when the representation of the at least one folder is created; and
   display, at the second node, the representation of the at least one folder in the location among the one or more folders on the file explorer interface.

2. The system of claim 1, wherein the system is configured such that the object associated with the at least one email address includes the at least one email address or an alias, and the file explorer interface is displayed using a file explorer client application and not via a web page; wherein the system is further configured such that the at least one email message is sent without including the file attachment with the at least one email message, and the storage at the second node does not store any file when the representation of the at least one folder is created, both for avoiding the at least one file from having to be communicated to and stored at the second node until the at least one file is requested by a user at the second node.

3. An apparatus, comprising:
   at least one non-transitory memory storing instructions; and
   one or more processors in communication with the at least one non-transitory memory, wherein the one or more processors execute the instructions to:
   cause, at a first node, display of at least one first interface with a first user interface element, utilizing first hypertext markup language-equipped code that is sent via at least one network;
   receive, from the first node via the at least one network, an indication of at least one folder via the first user interface element, utilizing the at least one first interface;
   cause, at the first node, display of at least one second interface with a second user interface element, utilizing second hypertext markup language-equipped code that is sent via the at least one network;
   receive, from the first node via the at least one network, indicia associated with at least one email address via the second user interface element, utilizing the at least one second interface;
   receive, from the first node via the at least one network, an indication to share the at least one folder;
   based on the receipt of the indication of the at least one folder, the indicia associated with the at least one email address, and the indication to share the at least one folder via the at least one network; generate at least one email message identifying the at least one folder and including a reference to the at least one folder, without including at least one file in the at least one folder as an attachment of the at least one email message;
   send, to a second node via the at least one network, the at least one email message, without including the at least one file in the at least one folder as an attachment of the at least one email message;
   based on the receipt of the indication of the at least one folder, the indicia associated with the at least one email address, and the indication to share the at least one folder via the at least one network; cause, utilizing particular code configured to be stored on a storage at the second node and further configured to cooperate with a file explorer interface, creation of a representation of the at least one folder in a location among one or more folders on the file explorer interface, where the storage at the second node does not store the at least one file when the creation of the representation of the at least one folder is caused;

cause, at the second node, display of the representation of the at least one folder in the location among the one or more folders on the file explorer interface;

detect, at the second node, an indication to open the at least one file in the at least one folder; and in response to detection of the indication to open the at least one file in the at least one folder, cause retrieval of the at least one file via the at least one network for permitting display of the at least one file at the second node.

4. The apparatus of claim 3, wherein the apparatus is configured such that the indicia associated with the at least one email address includes an alias associated with the at least one email address.

5. The apparatus of claim 3, wherein the apparatus is configured such that the indicia associated with the at least one email address includes the at least one email address.

6. The apparatus of claim 3, wherein the apparatus is configured such that the at least one first interface and the at least one second interface are separate windows that are displayed utilizing a single web page.

7. The apparatus of claim 3, wherein the one or more processors execute the instructions to:

receive, from the second node via the at least one network, an indication of a selection of the reference to the at least one folder; and cause, at the second node, display of the at least one folder, utilizing third hypertext markup language-equipped code.

8. The apparatus of claim 3, wherein the apparatus is configured such that the location among the one or more folders at the second node is based on user input received via the at least one first interface at the first node.

9. The apparatus of claim 8, wherein the apparatus is configured such that the location among the one or more folders at the second node is determined by user input at the first node.

10. The apparatus of claim 3, wherein the apparatus is configured such that the location among the one or more folders at the second node is automatically determined.

11. The apparatus of claim 3, wherein the apparatus is configured such that the at least one folder is identified as a result of search criteria received from a user.

12. The apparatus of claim 3, wherein the apparatus is configured such that the at least one email message and the file explorer interface are displayed via separate interfaces for permitting access to the at least one folder via multiple different interfaces only after receiving an indication of a selection of the reference to the at least one folder.

13. The apparatus of claim 3, wherein the apparatus is configured such that the indication of the at least one folder is capable of being received in response to a first single user input, the indicia associated with the at least one email address is capable of being received in response to a second single user input that immediately follows the first single user input, and the indication to share the at least one folder is capable of being received in response to a third single user input that immediately follows the second single user input.

14. The apparatus of claim 3, wherein the apparatus is configured such that, when the creation of the representation of the at least one folder is caused, an additional representation on the file explorer interface is caused to be created that represents the at least one file, where the file explorer interface is displayed by a file explorer client application without a web page.

15. The apparatus of claim 14, wherein the apparatus is configured such that the at least one folder and the at least one file are stored and synchronized utilizing at least one server, and wherein the apparatus is further configured such that the at least one email message is sent without including the at least one file as an attachment of the at least one email message, and the storage at the second node does not store the at least one file when the creation of the representation of the at least one folder is caused, both for avoiding the at least one file from having to be communicated to and stored at the second node until the at least one file is requested by a user at the second node using the additional representation.

16. The apparatus of claim 3, wherein the apparatus is configured such that at least one of:

said at least one network includes at least the Internet;

said one or more processors include at least one first processor at least one server in communication between the first node and the second node and at least one second processor at the second node, and the instructions include first instructions for being executed by the at least one first processor and second instructions that include the particular code which takes the form of an extension for being executed by the at least one second processor in connection with other code associated with the file explorer interface;

said one or more processors include at least one first processor at least one server and at least one second processor at the second node, and the instructions include first instructions for being executed by the at least one first processor and second instructions including the particular code for being executed by the at least one second processor, where execution of the first instructions results in the causation of the display of the at least one first interface, the receipt of the indication of the at least one folder, the causation of the display of the at least one second interface, the receipt of the indicia associated with the at least one email address, and the sending of the at least one email, where execution of the second instructions result in the causation of the creation of the representation of the at least one folder, the detection the indication to open the at least one file in the at least one folder, and the causation of the retrieval of the at least one file via the at least one network;

said at least one first interface is an email interface;

said at least one second interface is an email interface;

said at least one first interface is a single interface;

said at least one second interface is a single interface;

said at least one first interface is different from the said at least one second interface;

said at least one first interface include a plurality of first interfaces;

said at least one second interface includes a plurality of second interfaces;

said display of the at least one first interface is caused by serving the at least one first interface via the at least one network;

said display of the at least one second interface is caused by serving the at least one first interface via the at least one network;

said first hypertext markup language-equipped code is included in a first web page and the second hypertext markup language-equipped code is included in a second web page;

said indication of the at least one folder is generated based on a user selection of the at least one folder;

said indication of the at least one folder is generated based on a user at least one of searching or locating the at least one folder;

said indication of the at least one folder is generated based on a user input in connection with a folder-related user interface element associated with the at least one folder;
said indication of the at least one folder is generated based on a user entry of text associated with the at least one folder;
said indication of the at least one folder includes a name of the at least one folder;
said indicia associated with the at least one email address is generated based on a user selection of the at least one email address;
said indicia associated with the at least one email address is generated based on a user locating the at least one email address;
said indicia associated with the at least one email address is generated based on a user input in connection with an email-related user interface element;
said indicia associated with the at least one email address is generated based on a user entry of text associated with the at least email message;
said indicia associated with the at least one email address is received before the indication of the at least one folder;
said indicia associated with the at least one email address is received after the indication of the at least one folder;
said indicia includes a text string that is associated with the at least one email address;
said indication to share is generated by a user selection of a mount button;
said indication to share indicates a desire of a user to begin a sharing process;
said indication to share indicates a desire of a user to continue a sharing process;
said indication to share is generated in connection with a drag and drop operation;
said indication to share is received, utilizing the at least one second interface;
said at least one email message is generated based on the receipt of the indication of the at least one folder, the indicia associated with the at least one email address, and the indication to share the at least one folder, by being generated in response to the receipt of all of the indication of the at least one folder, the indicia associated with the at least one email address, and the indication to share the at least one folder via the at least one network;
said at least one email message is generated based on the receipt of the indication of the at least one folder, the indicia associated with the at least one email address, and the indication to share the at least one folder vi, by being generated only after the receipt of all of the indication of the at least one folder, the indicia associated with the at least one email address, and the indication to share the at least one folder via the at least one network;
said representation is created based on the receipt of the indication of the at least one folder, the indicia associated with the at least one email address, and the indication to share the at least one folder via the at least one network, by being created in response to the receipt of all of the indication of the at least one folder, the indicia associated with the at least one email address, and the indication to share the at least one folder via the at least one network;
said representation is created based on the receipt of the indication of the at least one folder, the indicia associated with the at least one email address, and the indication to share the at least one folder via the at least one network, by being created only after the receipt of all of the indication of the at least one folder, the indicia associated with the at least one email address, and the indication to share the at least one folder via the at least one network;
said representation includes a folder icon;
said representation includes a folder visual element;
said representation is created based on at least one aspect of the at least one email message;
said indication to open the at least one file includes a selection of the at least one file;
said indication to open the at least one file includes a selection of the at least one file and a detection of a selection of an open user interface element;
said storage at the second node does not store the at least file until after the retrieval of the at least one file;
said storage at the second node includes at least one of volatile memory or non-volatile memory;
said file explorer interface is associated with an email interface that displays the at least one email message;
said file explorer interface is part of an email interface that displays the at least one email message;
said file explorer interface is accessed via an email interface that displays the at least one email message;
said email message includes a mount descriptor;
the at least one file is retrieved via the at least one network from a server in communication between the first node and the second node;
the at least one file is retrieved via the at least one network from a server in communication between the first node and a third node;
said reference includes a uniform resource identifier;
said reference includes a link; or
the apparatus further comprises the file explorer interface.

17. A system, comprising:
at least one non-transitory memory storing instructions; and
one or more processors in communication with the at least one non-transitory memory, wherein the one or more processors execute the instructions to:
send a first communication over at least one network that results in display, at a first node, a first user interface element, a second user interface element, and a third user interface element;
receive, from the first node via the at least one network, information associated with at least one data object via the first user interface element;
receive, from the first node via the at least one network, at least one object associated with at least one email address via the second user interface element;
receive, from the first node via the at least one network, a message associated with a selection of the third user interface element;
based on the receipt of the information associated with the at least one data object, the at least one object associated with the at least one email address, and the message associated with the selection of the third user interface element via the at least one network;
send, to a second node via the at least one network, at least one email message identifying the at least one data object and including a reference to the at least one data object, without including a file attachment with the at least one email message;
based on the receipt of the information associated with the at least one data object, the at least one object associated with the at least one email address, and the message associated with the selection of the third user interface element via the at least one network; cause, utilizing code configured to be stored on a storage at the second node and further configured to cooperate with a file explorer interface of a client-based file explorer application, creation of a representation of the at least one data object in a location among one or more folders on the file explorer interface, where the storage at the second node does not store any file in the at least one data object when the creation of the representation of the at least one data object is caused; and cause, at the second node, display of the representation of the at least one data object in the location among the one or more folders on the file explorer interface.

18. The system of claim 17, wherein the system is configured such that the email message is sent without including the file attachment with the at least one email message, and the storage at the second node does not store any file when the creation of the representation of the at least one data object is caused, both for avoiding the at least one file from having to be communicated to and stored at the second node until the at least one file is requested by a user at the second node.

19. A computer-implemented method, comprising:

displaying, at a first node, at least one first interface with a first user interface element, utilizing first hypertext markup language-equipped code that is received via at least one network, the first node including at least one non-transitory memory in communication with at least one processor;

receiving, utilizing the at least one first interface at the first node, an indication of at least one folder via the first user interface element;

sending, from the first node via the at least one network, the indication of the at least one folder;

displaying, at the first node, at least one second interface with a second user interface element, utilizing second hypertext markup language-equipped code that is received via the at least one network;

receiving, utilizing the at least one second interface at the first node, indicia associated with at least one email address via the second user interface element;

sending, from the first node via the at least one network, the indicia associated with the at least one email address;

receiving, at the first node, an indication to share the at least one folder;

sending, from the first node via the at least one network, the indication to share the at least one folder;

after the indication of the at least one folder, the indicia associated with the at least one email address, and the indication to share the at least one folder are sent from the first node via the at least one network; receiving, at a second node via the at least one network, at least one email message identifying the at least one folder and including a reference to the at least one folder, without including at least one file in the at least one folder as an attachment of the at least one email message;

after the indication of the at least one folder, the indicia associated with the at least one email address, and the indication to share the at least one folder are sent from the first node via the at least one network; creating, utilizing code configured to be stored on a storage at the second node and further configured to cooperate with a file explorer interface, a representation of the at least one folder in a location among one or more folders on the file explorer interface, where the storage of the second node does not store the at least one file when the representation of the at least one folder is created;

displaying, at the second node, the representation of the at least one folder in the location among the one or more folders on the file explorer interface;

receiving, at the second node, an indication to open the at least one file in the at least one folder;

in response to the receipt of the indication to open the at least one file in the at least one folder, retrieving the at least one file via the at least one network; and in response to the retrieval of the at least one file via the at least one network, displaying the at least one file at the second node.

20. The method of claim 19, wherein the indicia associated with the at least one email address includes an alias associated with the at least one email address.

21. The method of claim 19, wherein the indicia associated with the at least one email address includes the at least one email address.

22. The method of claim 19, wherein the at least one first interface and the at least one second interface are displayed via a single web page.

23. The method of claim 19, wherein the location among the one or more folders at the second node is based on user input received via the at least one first interface at the first node.

24. The method of claim 19, wherein the location among the one or more folders at the second node is determined by user input at the first node.

25. The method of claim 19, wherein the file explorer interface is displayed by a client-based file explorer application.

26. The method of claim 19, wherein the at least one folder is identified as a result of search criteria received from a user.

27. The method of claim 19, wherein the at least one email message and the file explorer interface are displayed via separate interfaces for permitting access to the at least one folder via multiple different interfaces only after sending an indication of a selection of the reference to the at least one folder.

28. The method of claim 19, wherein the indication of the at least one folder is capable of being received in response to a first single user input, the indicia associated with the at least one email address is capable of being received in response to a second single user input that immediately follows the first single user input, and the indication to share the at least one folder is capable of being received in response to a third single user input that immediately follows the second single user input.

29. The method of claim 19, wherein when the representation of the at least one folder is created, an additional representation on the file explorer interface is created that represents the at least one file, such that the email message is sent without including the at least one file as an attachment of the at least one email message, and the storage at the second node does not store the at least one file when the representation of the at least one folder is created, both for avoiding the at least one file from having to be communicated to and stored at the second node until the at least one file is requested by a user at the second node using the additional representation.

30. The method of claim 19, and further comprising:
receiving, utilizing the at least one email message at the second node, an indication of a selection of the reference to the at least one folder;
sending, from the second node via the at least one network, the indication of the selection of the reference to the at least one folder;
displaying, at the second node, the at least one folder, utilizing third hypertext markup language-equipped code that is received via the at least one network.

* * * * *